US006177922B1

United States Patent
Schiefer et al.

(10) Patent No.: US 6,177,922 B1
(45) Date of Patent: Jan. 23, 2001

(54) MULTI-SCAN VIDEO TIMING GENERATOR FOR FORMAT CONVERSION

(75) Inventors: Harold Schiefer, North York; Steven Hanna, Markham, both of (CA)

(73) Assignee: Genesis Microship, Inc., Markham (CA)

( * ) Notice: Under 35 U.S.C. 154(b), the term of this patent shall be extended for 0 days.

(21) Appl. No.: 08/839,745

(22) Filed: Apr. 15, 1997

(51) Int. Cl.[7] .................................................. G09G 5/00
(52) U.S. Cl. .......................... 345/132; 345/213; 348/441; 348/510
(58) Field of Search .................. 345/132, 213, 345/112, 3; 348/426, 440, 441, 443, 446, 510, 194; 370/466

(56) References Cited

U.S. PATENT DOCUMENTS

| | | | |
|---|---|---|---|
| 4,956,699 | * 9/1990 | Ohashi | 348/510 |
| 4,979,169 | * 12/1990 | Almond et al. | 370/466 |
| 5,327,235 | * 7/1994 | Richards | 348/441 |
| 5,517,253 | 5/1996 | De Lange | 348/513 |
| 5,579,025 | 11/1996 | Itoh | 345/3 |
| 5,585,856 | 12/1996 | Nakaya et al. | 348/441 |
| 5,587,742 | * 12/1996 | Hau et al. | 348/441 |
| 5,606,348 | * 2/1997 | Chiu | 345/213 |
| 5,668,594 | * 9/1997 | Cahill, III | 348/194 |
| 5,739,867 | * 4/1998 | Eglit | 348/581 |
| 5,758,135 | * 5/1998 | Tucker et al. | 345/3 |

FOREIGN PATENT DOCUMENTS

| | | |
|---|---|---|
| 0444368A1 | 9/1991 | (EP) . |
| 0479508A2 | 4/1992 | (EP) . |
| 98 30 2916 | 10/1998 | (EP) . |
| 2179185A | 2/1987 | (GB) . |
| 2281835A | 3/1995 | (GB) . |

* cited by examiner

Primary Examiner—Steven J. Saras
Assistant Examiner—Fritz Alphonse
(74) Attorney, Agent, or Firm—Marger Johnson & McCollom, P.C.

(57) ABSTRACT

This invention is directed to a method and apparatus for producing video signal timing for a display device that has a display format different from the input video format. It also provides a method and apparatus for producing video signal timing in cases where the input video line rate and display output line rates are not the same. Furthermore, a method and apparatus are provided for synchronizing the display output line rate to the input line rate so that the source video line input rate can sustain the rate at which the input lines are processed to generate display video lines using a minimum amount of memory buffer for a variety of display processing methods. Another aspect of the present invention provides a method and apparatus for synchronizing display output timing to input video timing such that both are locked in terms of frame rate, but skewed in terms of frame phase, in order to accommodate latency incurred by processing of source video data to generate the display video data. A method and apparatus are also contemplated by this invention for adjusting the skew between the input source video frame timing and the display output video from timing to accommodate latency for various types of display processing such as, but not limited to, scaling, video format conversion, and filtering operations.

9 Claims, 33 Drawing Sheets

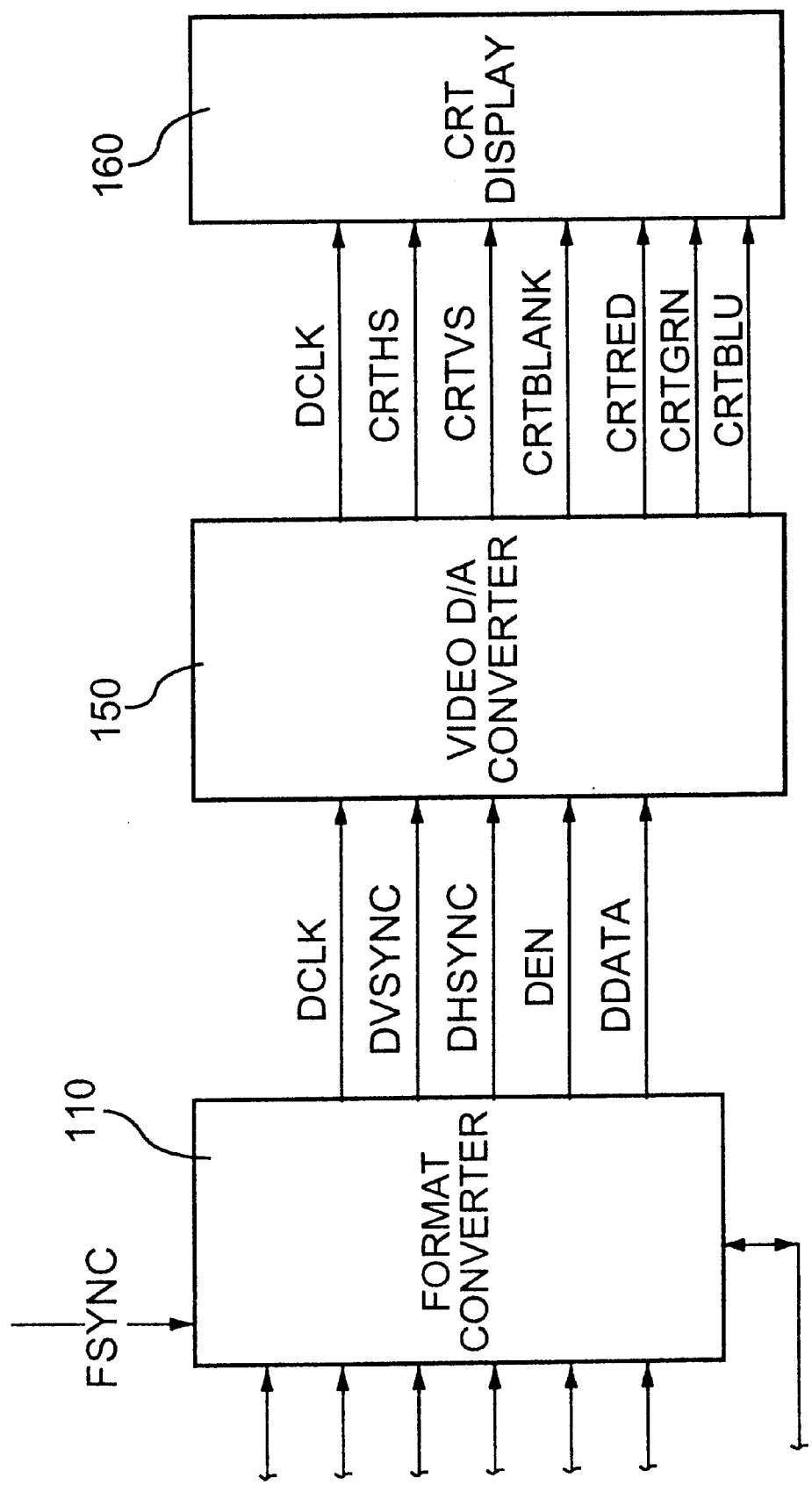
FIG. 2 -CONTINUATION

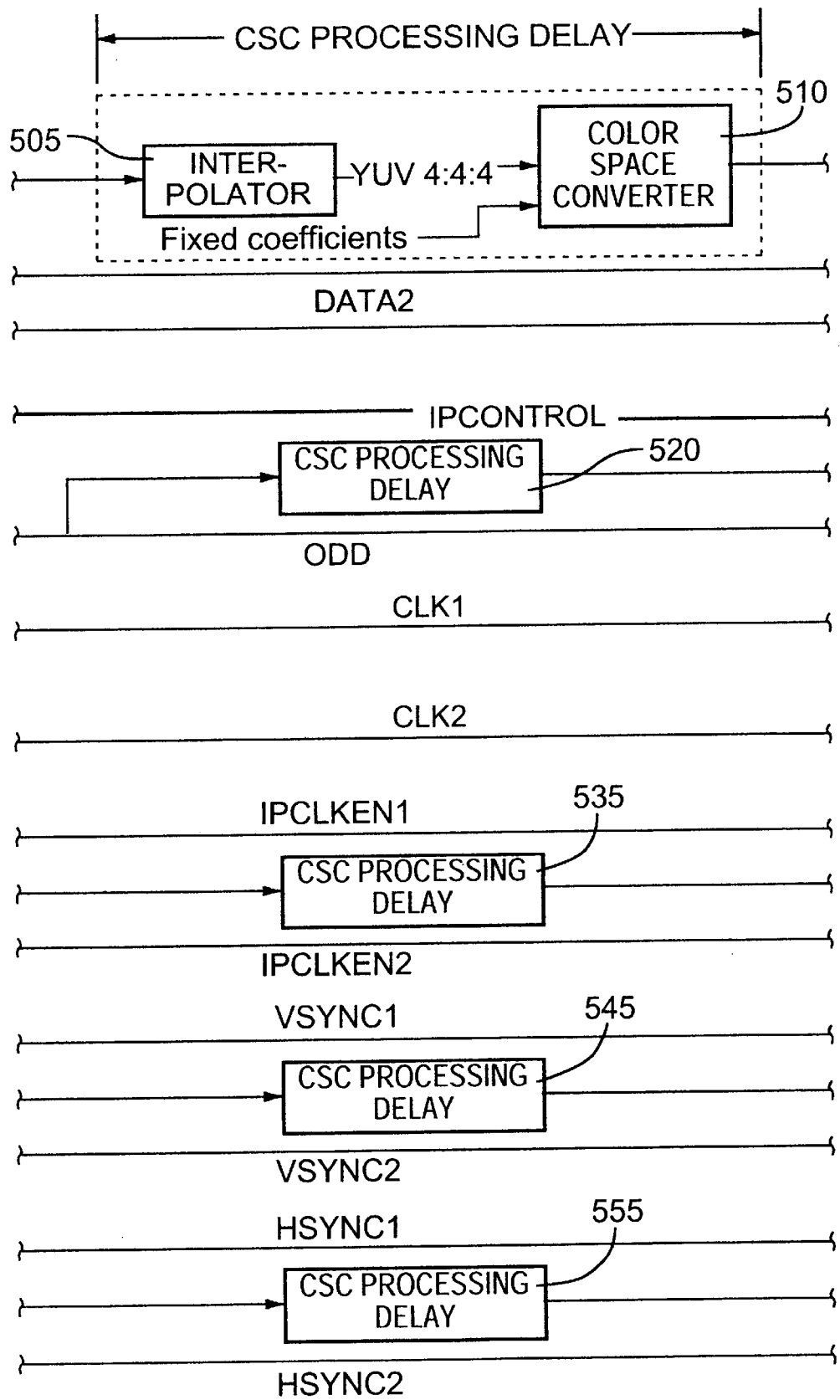
FIG. 5 -CONTINUATION

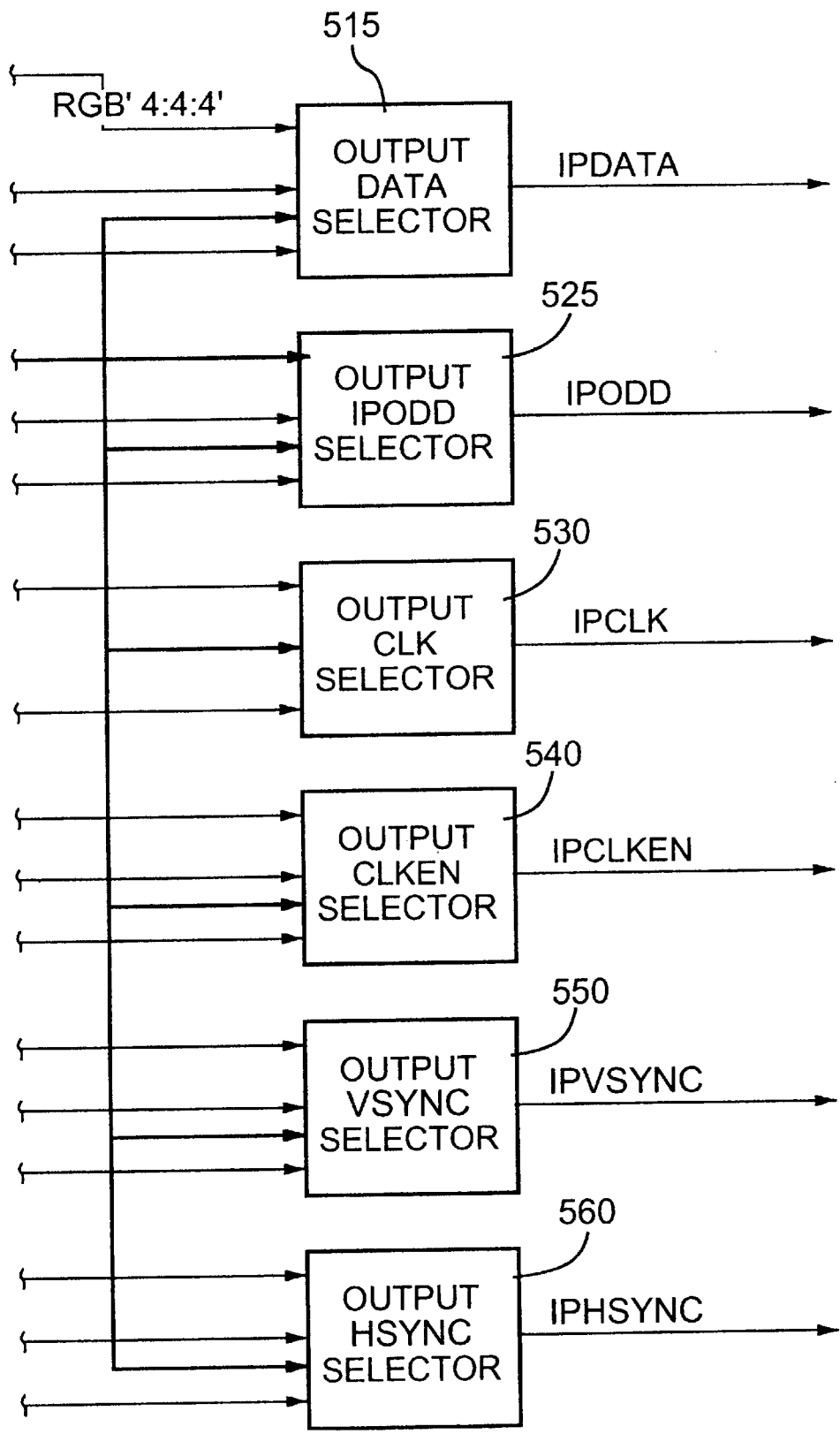
FIG. 5 -CONTINUATION

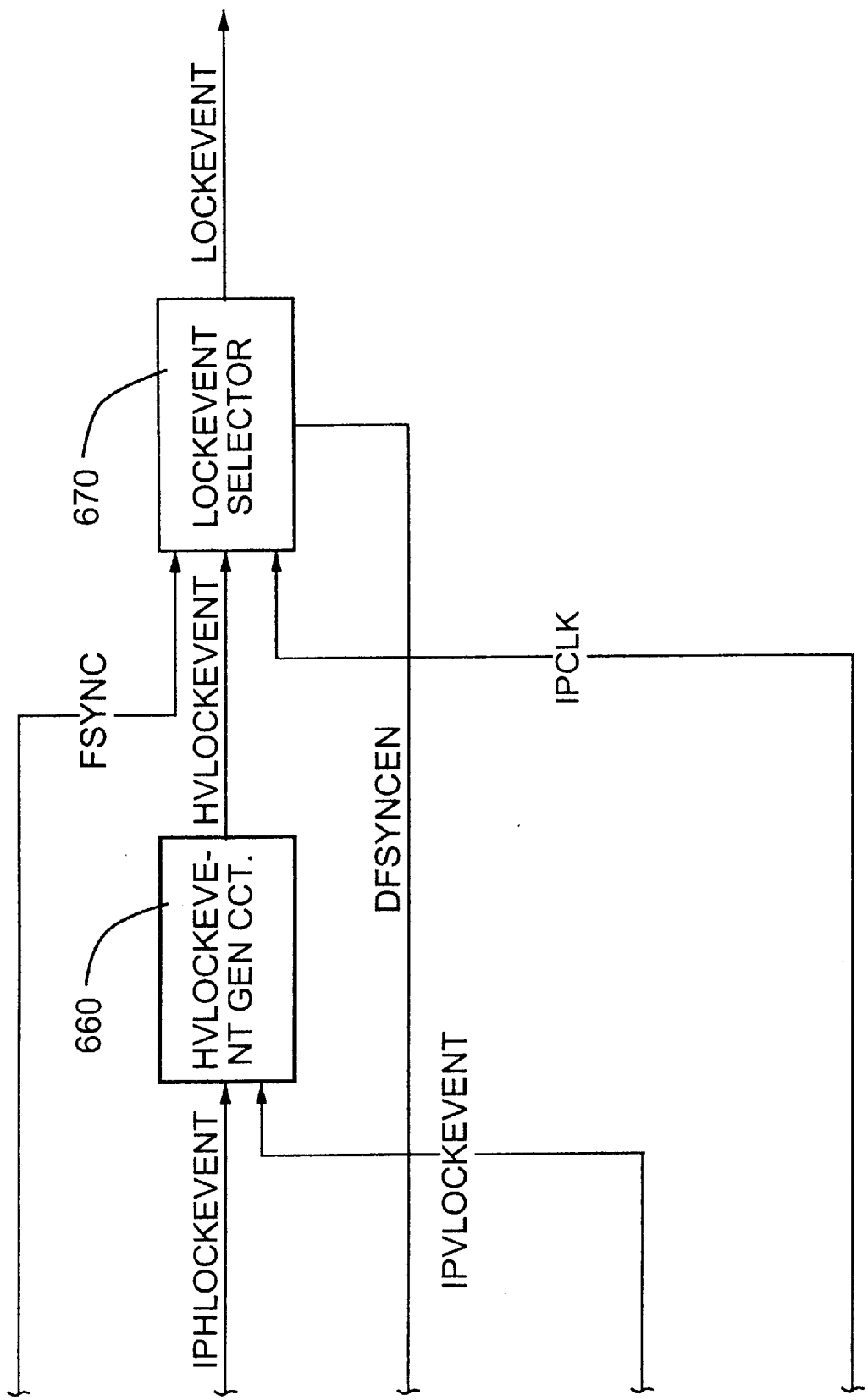
FIG. 6 -CONTINUATION

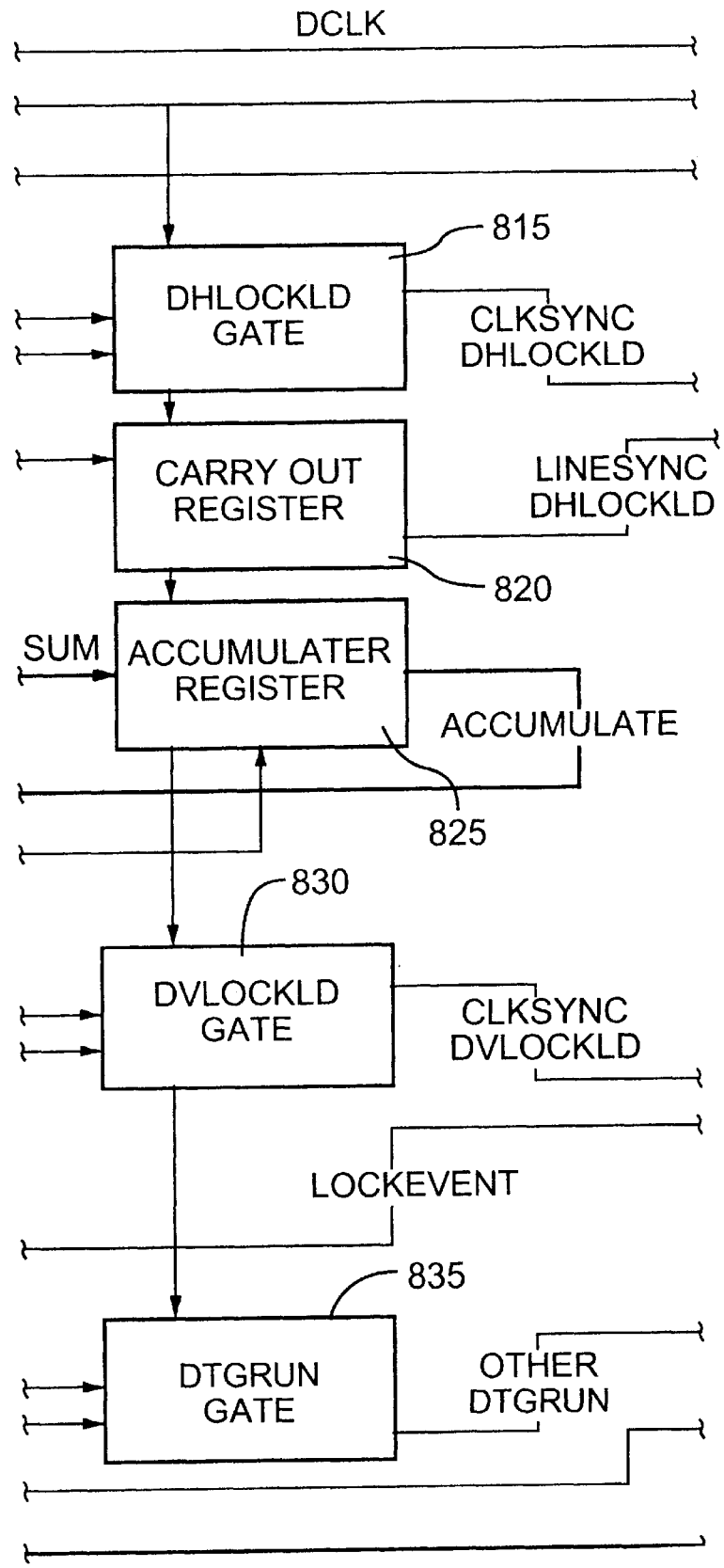
FIG. 8 -CONTINUATION

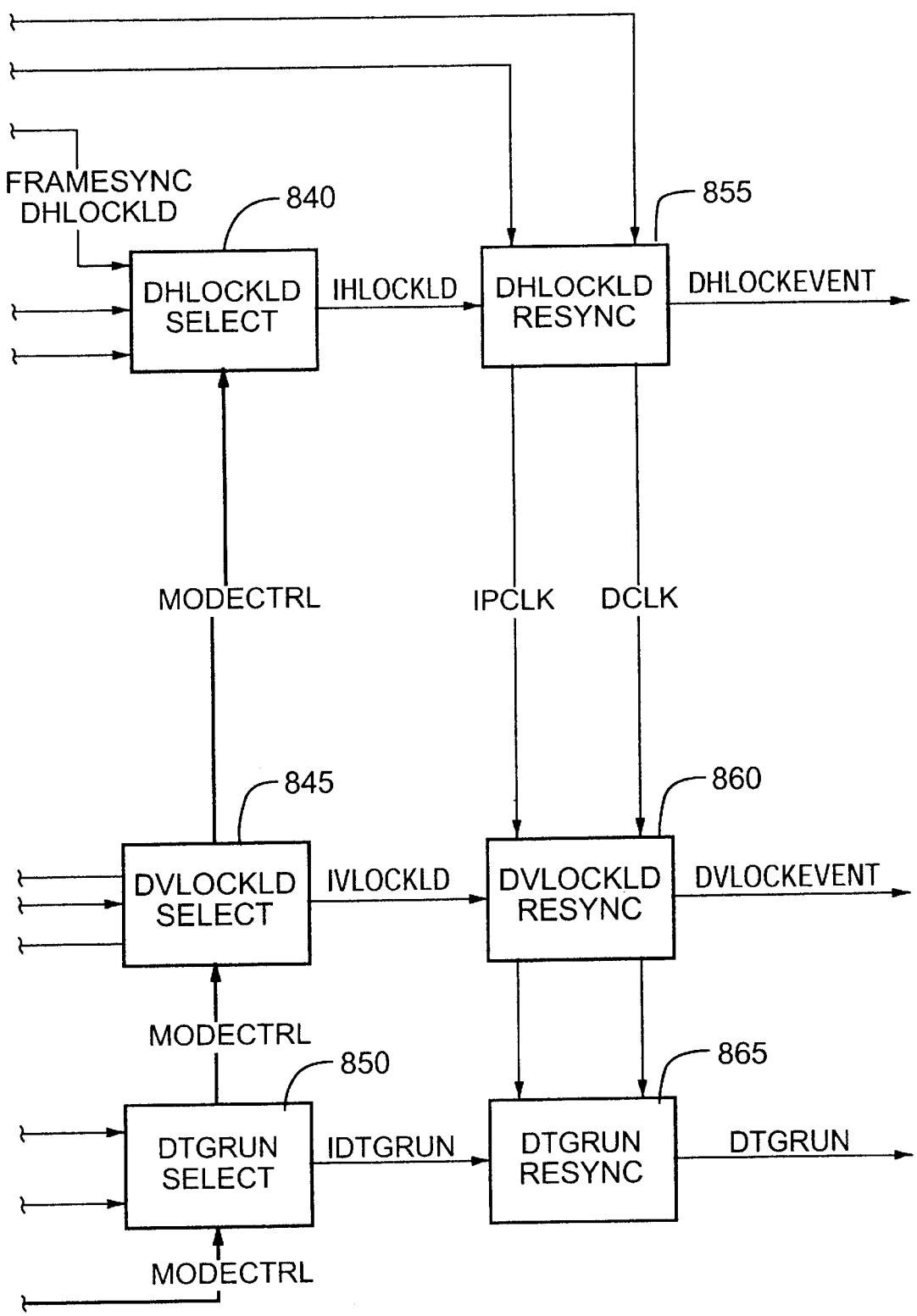
FIG. 8 -CONTINUATION

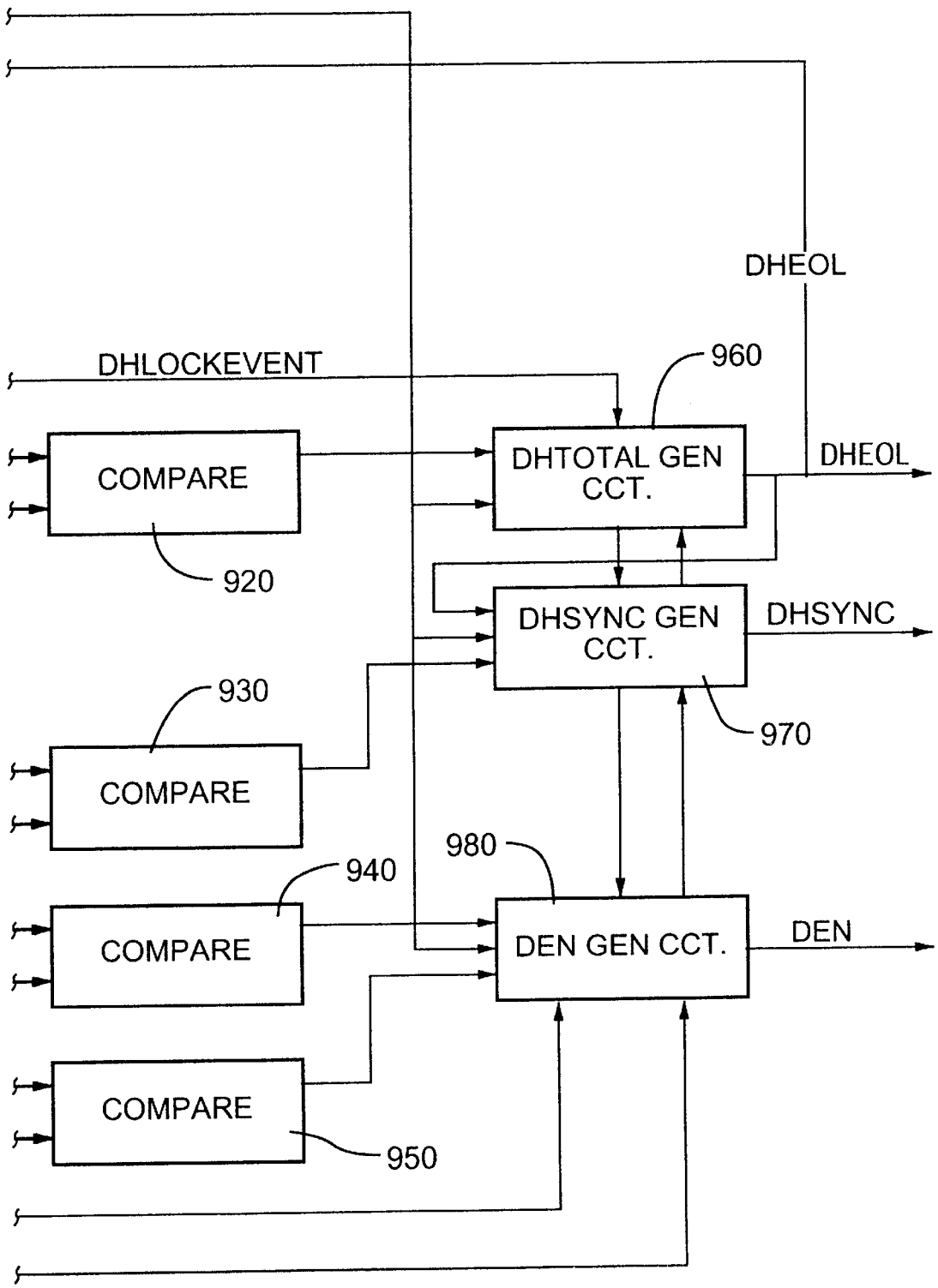
FIG. 9 -CONTINUATION

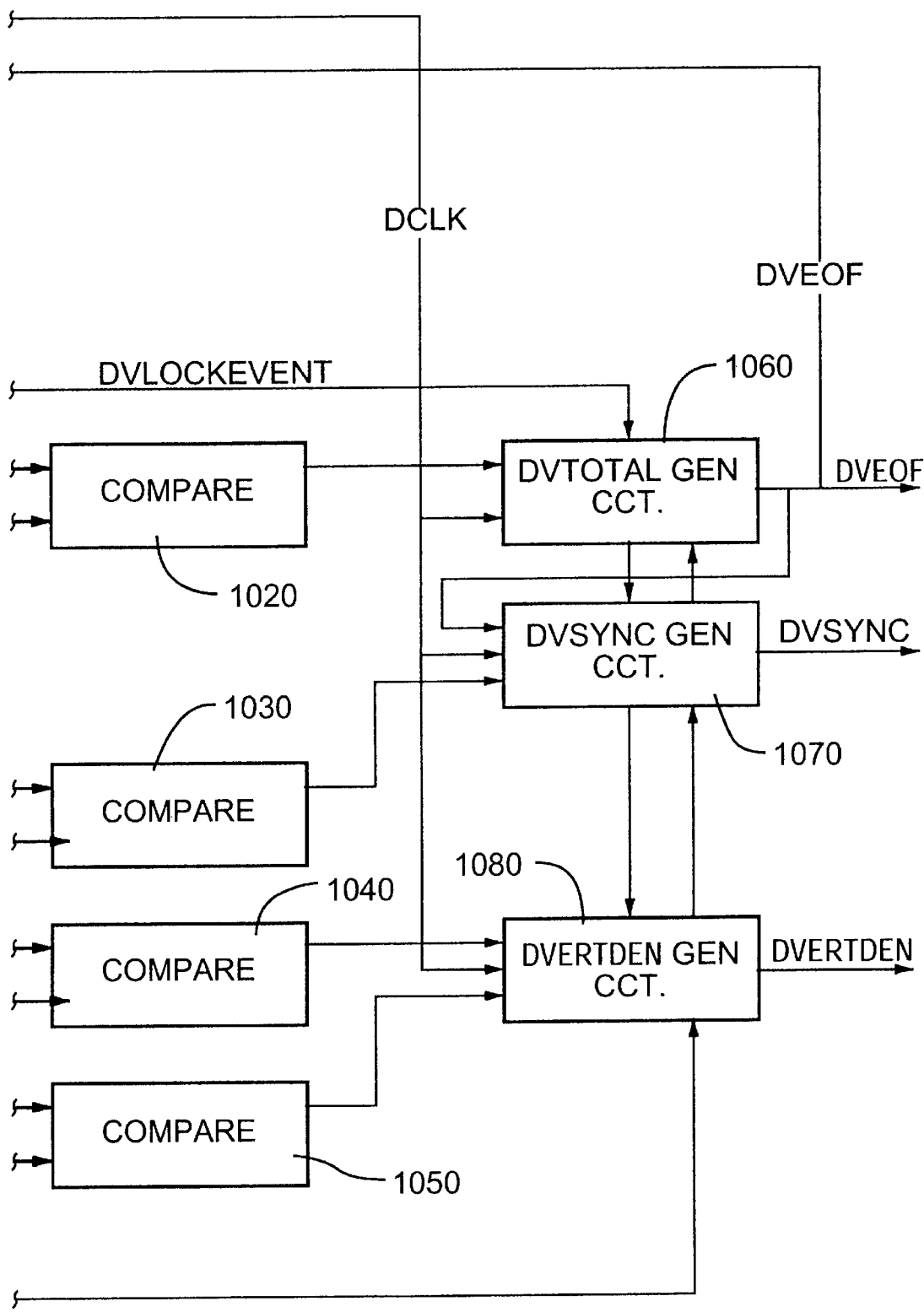
FIG. 10 -CONTINUATION

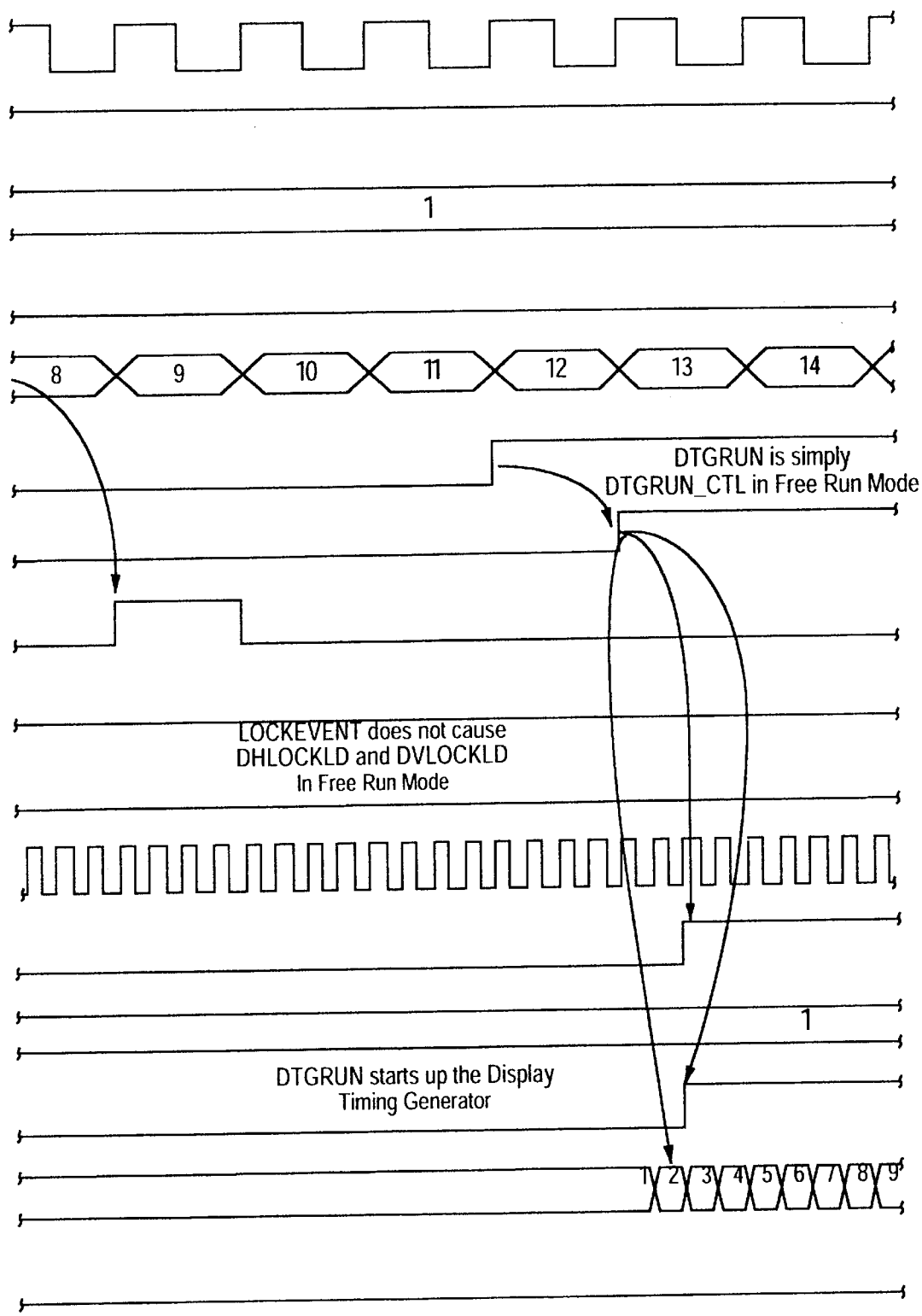
FIG. 11 -CONTINUATION

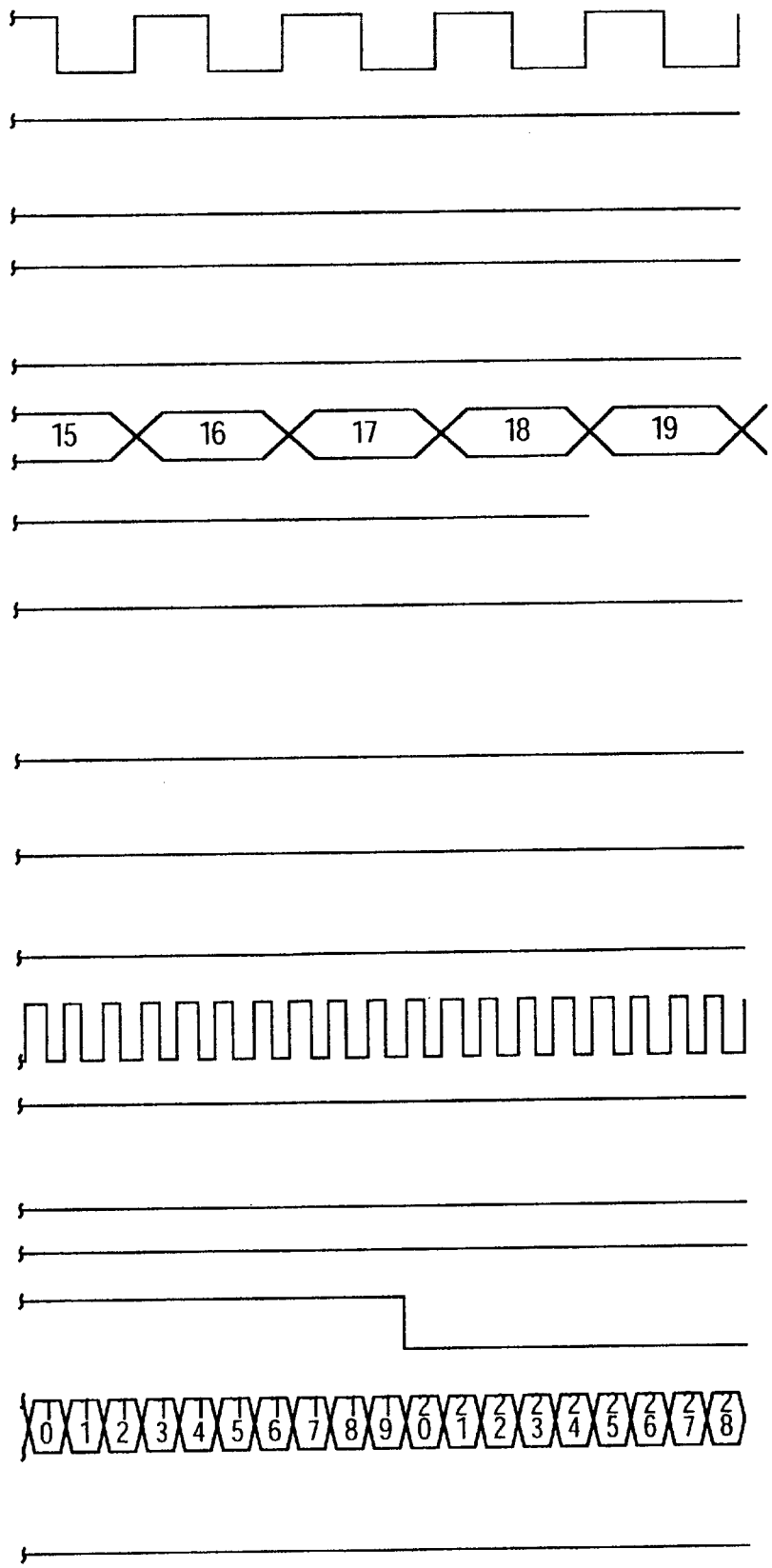
FIG. 11 -CONTINUATION

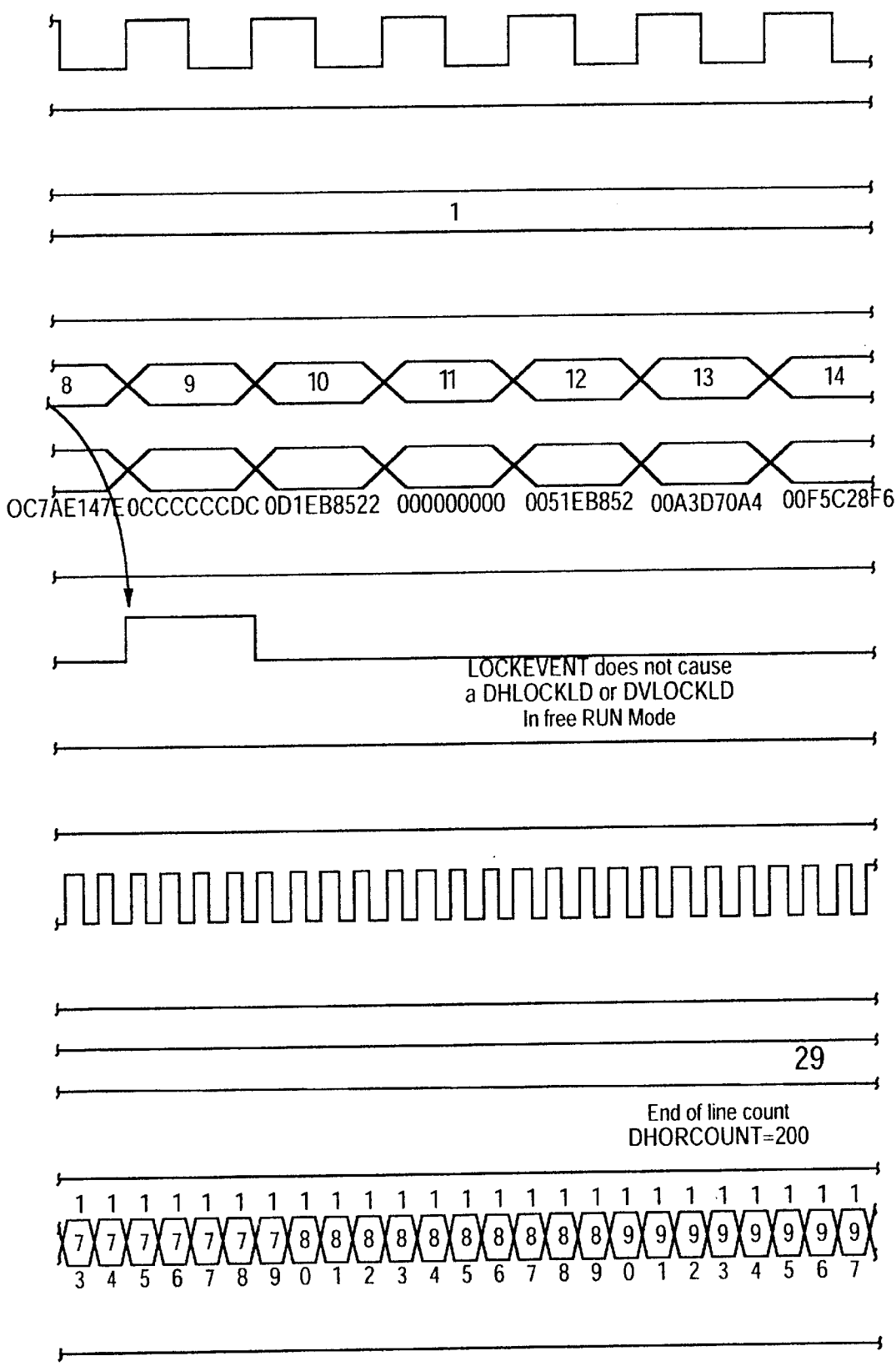
FIG. 12 -CONTINUATION

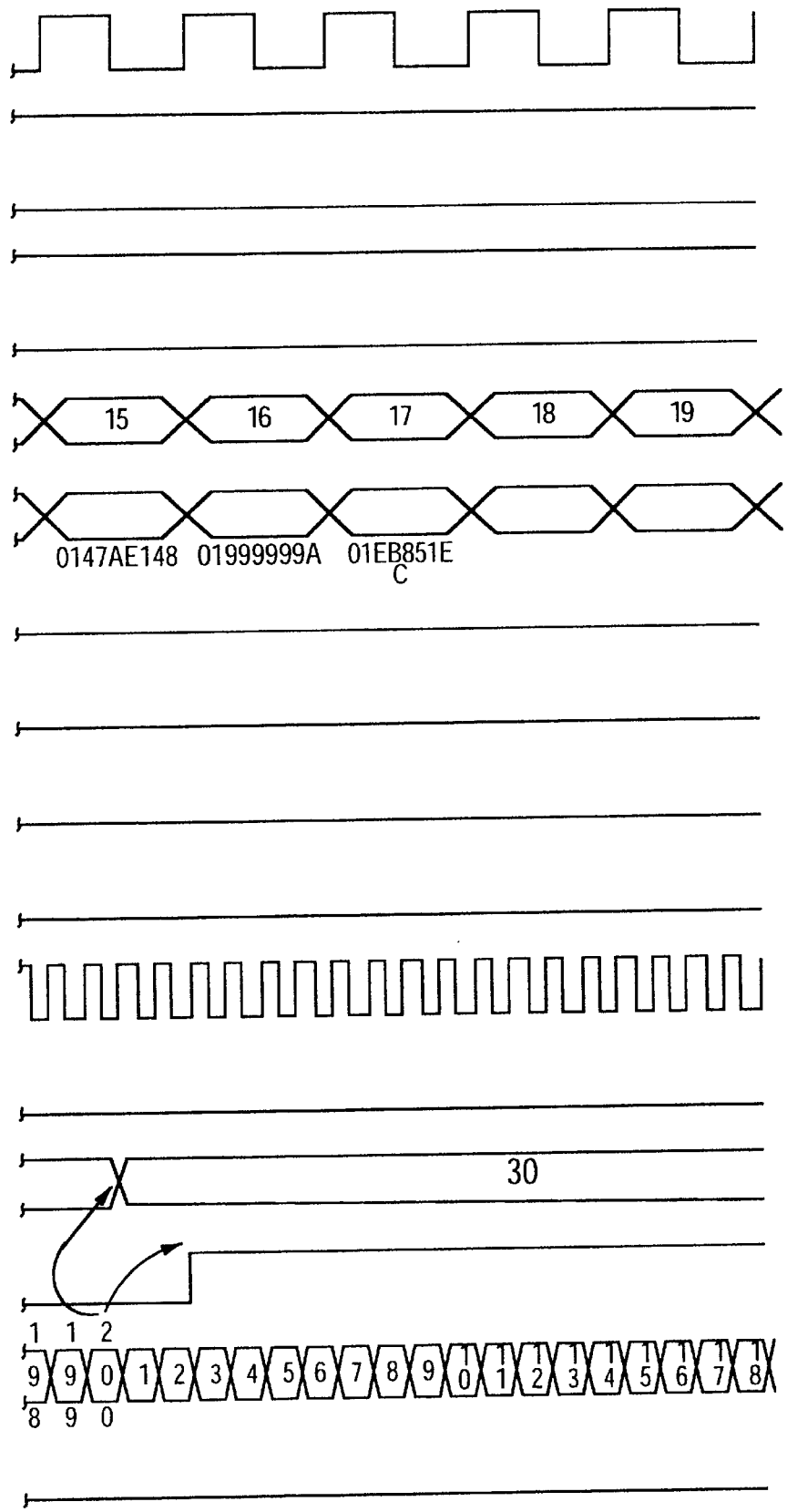
FIG. 12 -CONTINUATION

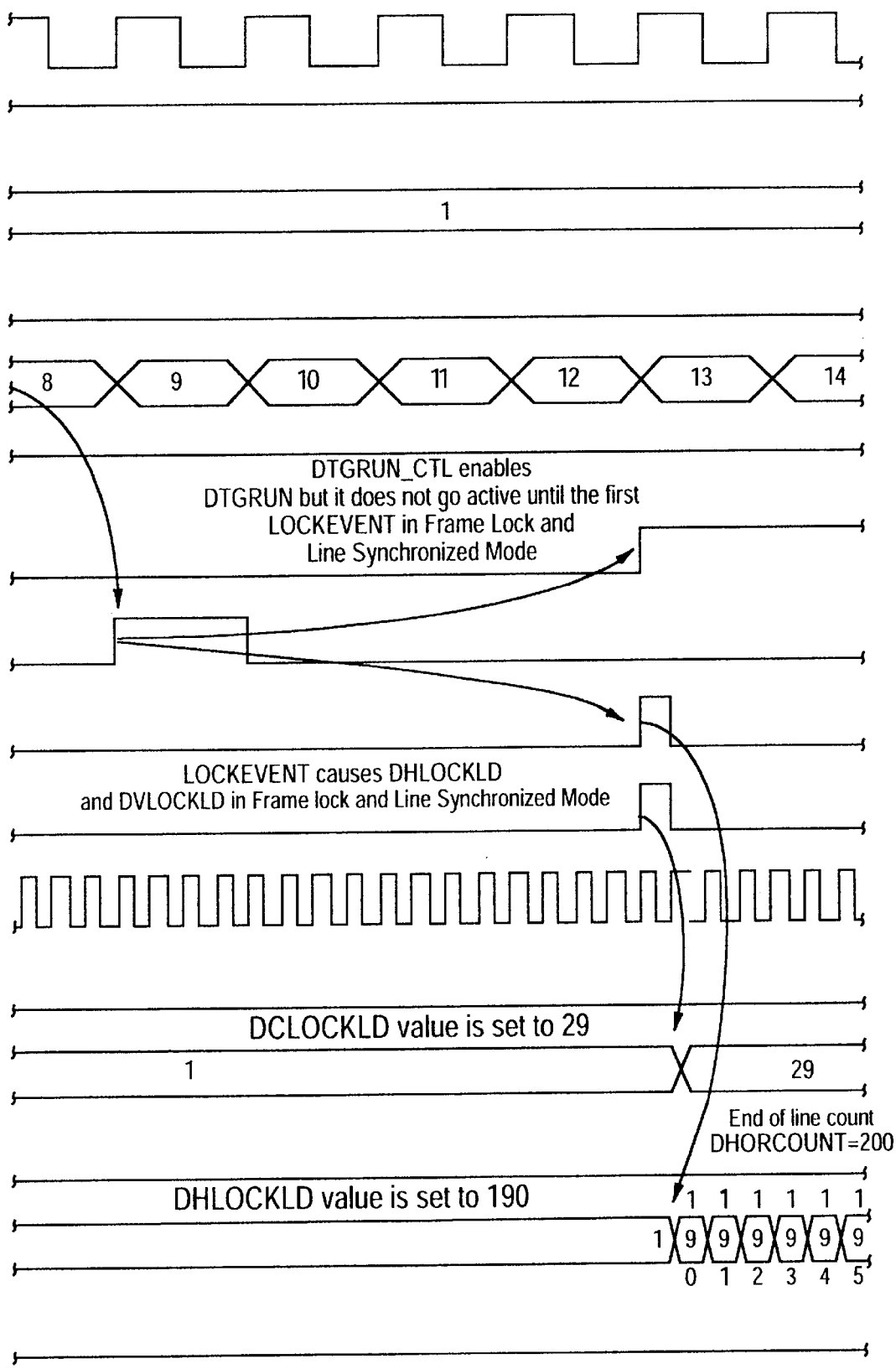
FIG. 13 -CONTINUATION

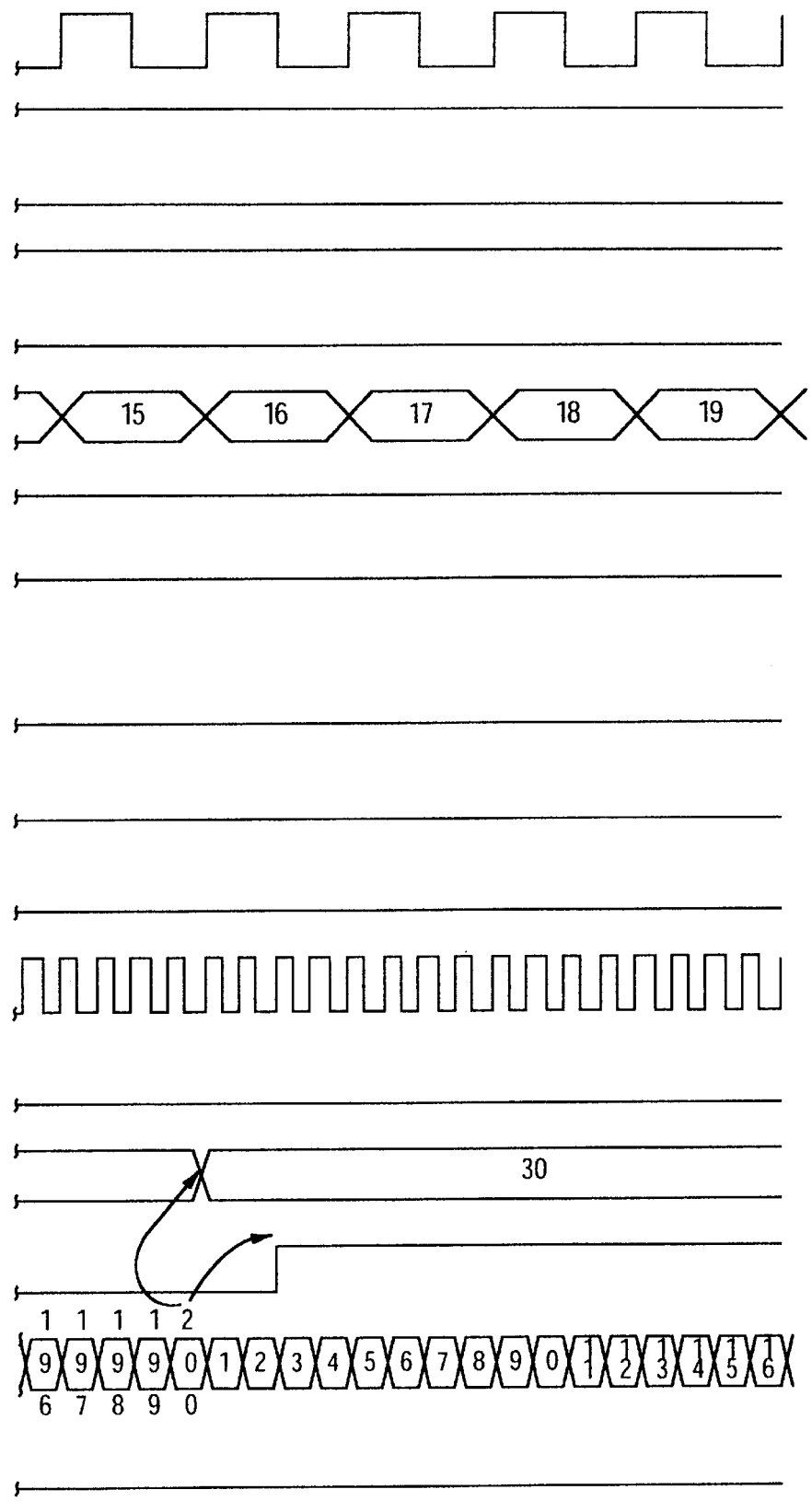
FIG. 13 -CONTINUATION

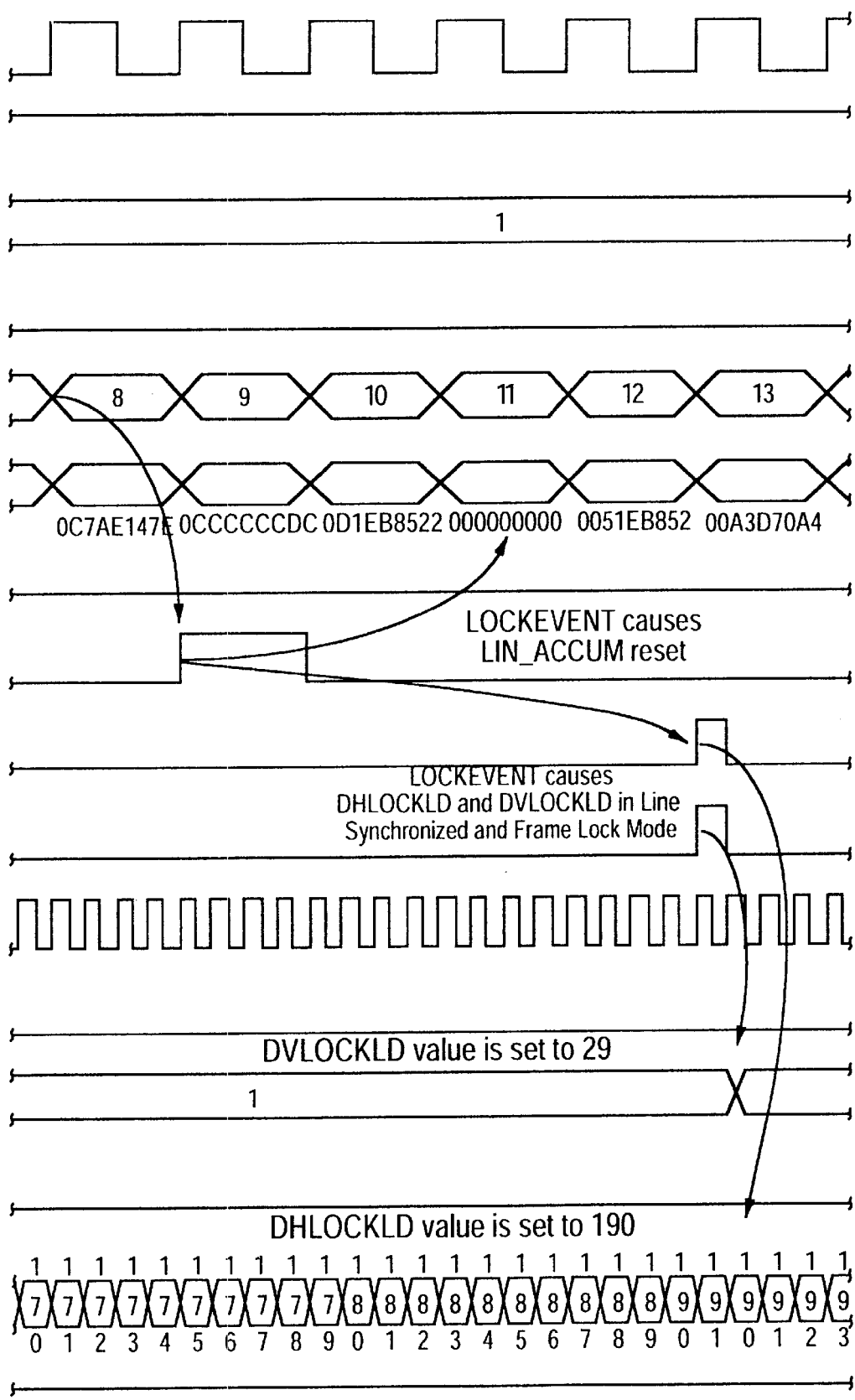
FIG. 14 -CONTINUATION

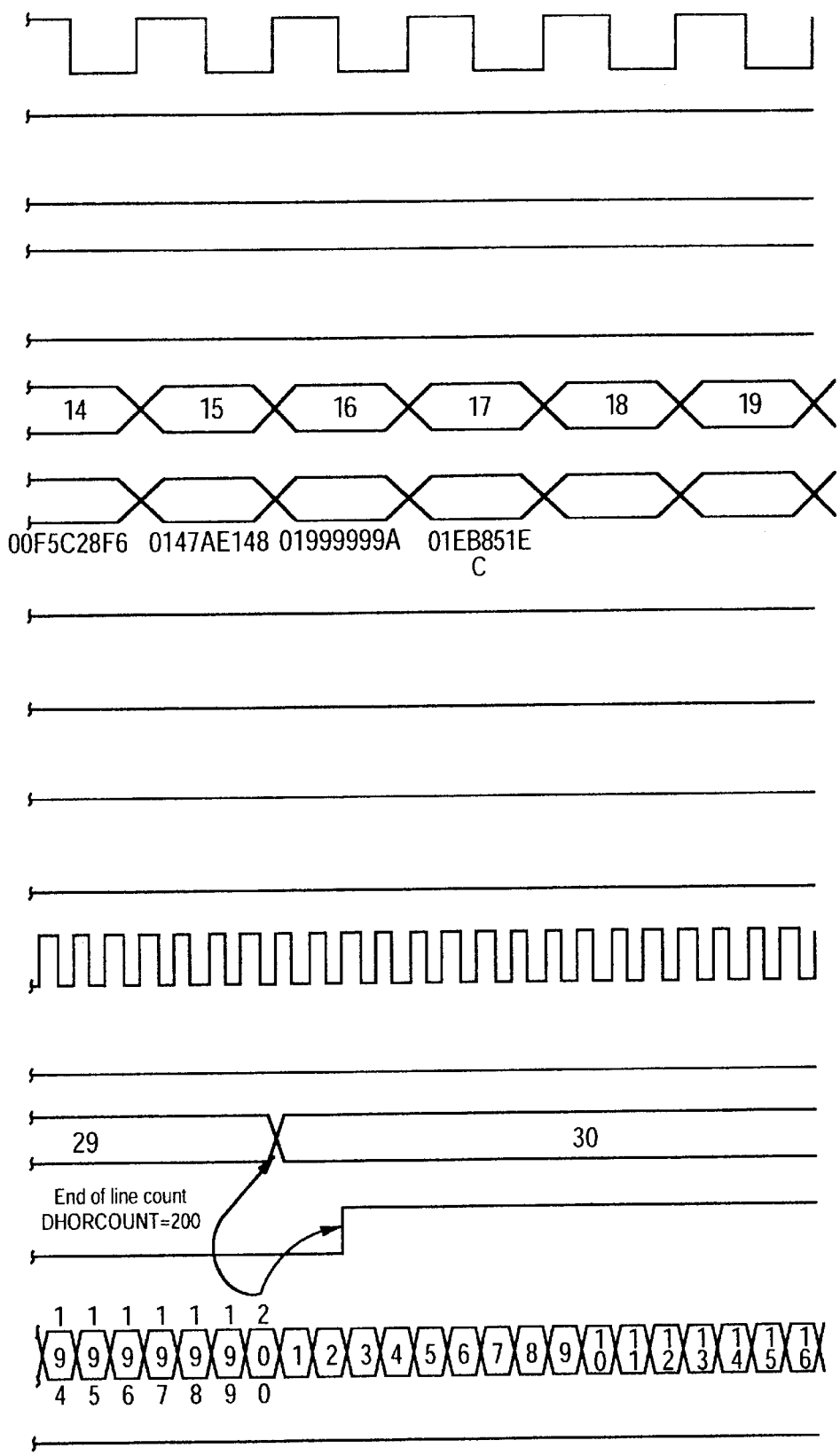
FIG. 14 -CONTINUATION

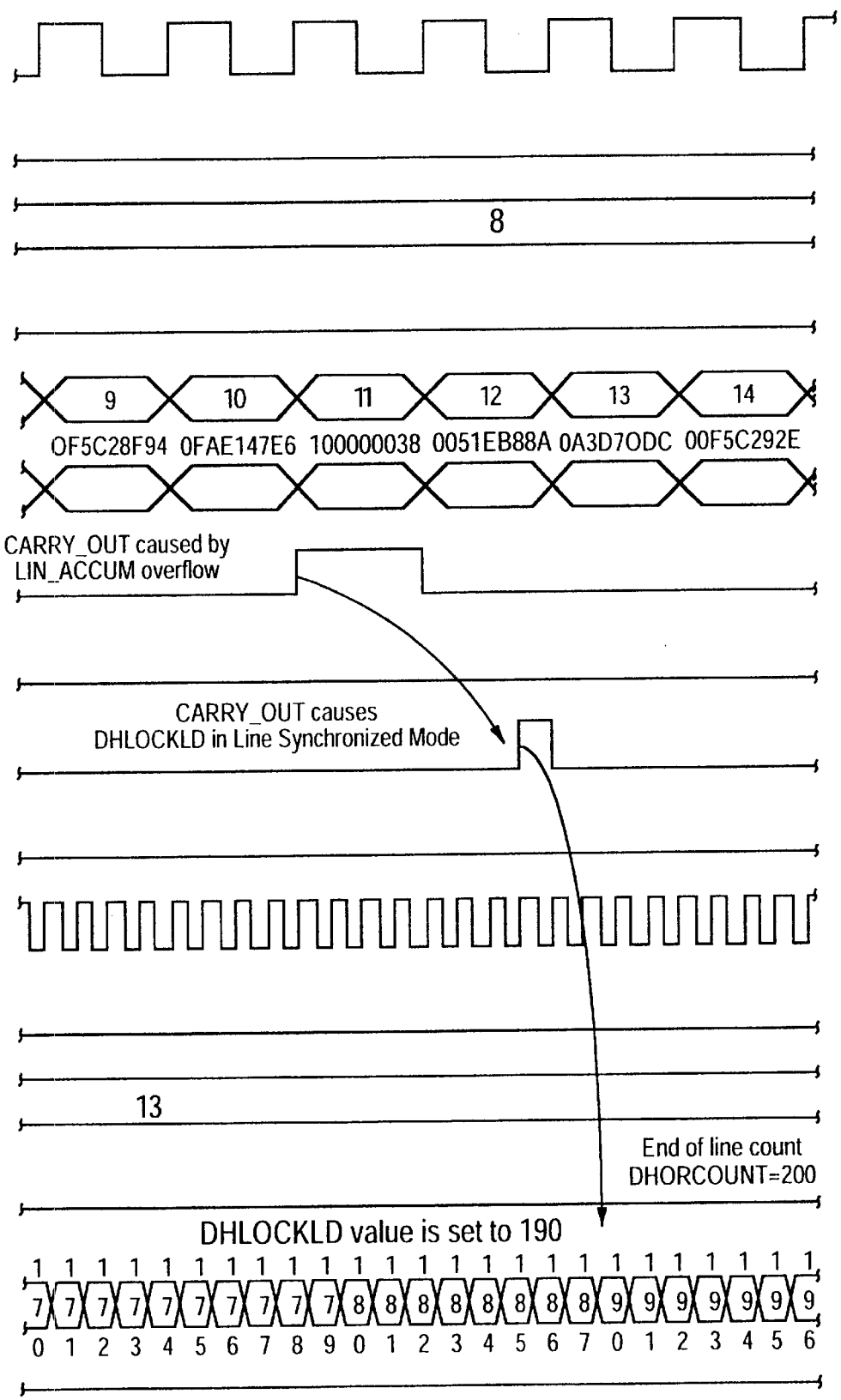
FIG. 15 -CONTINUATION

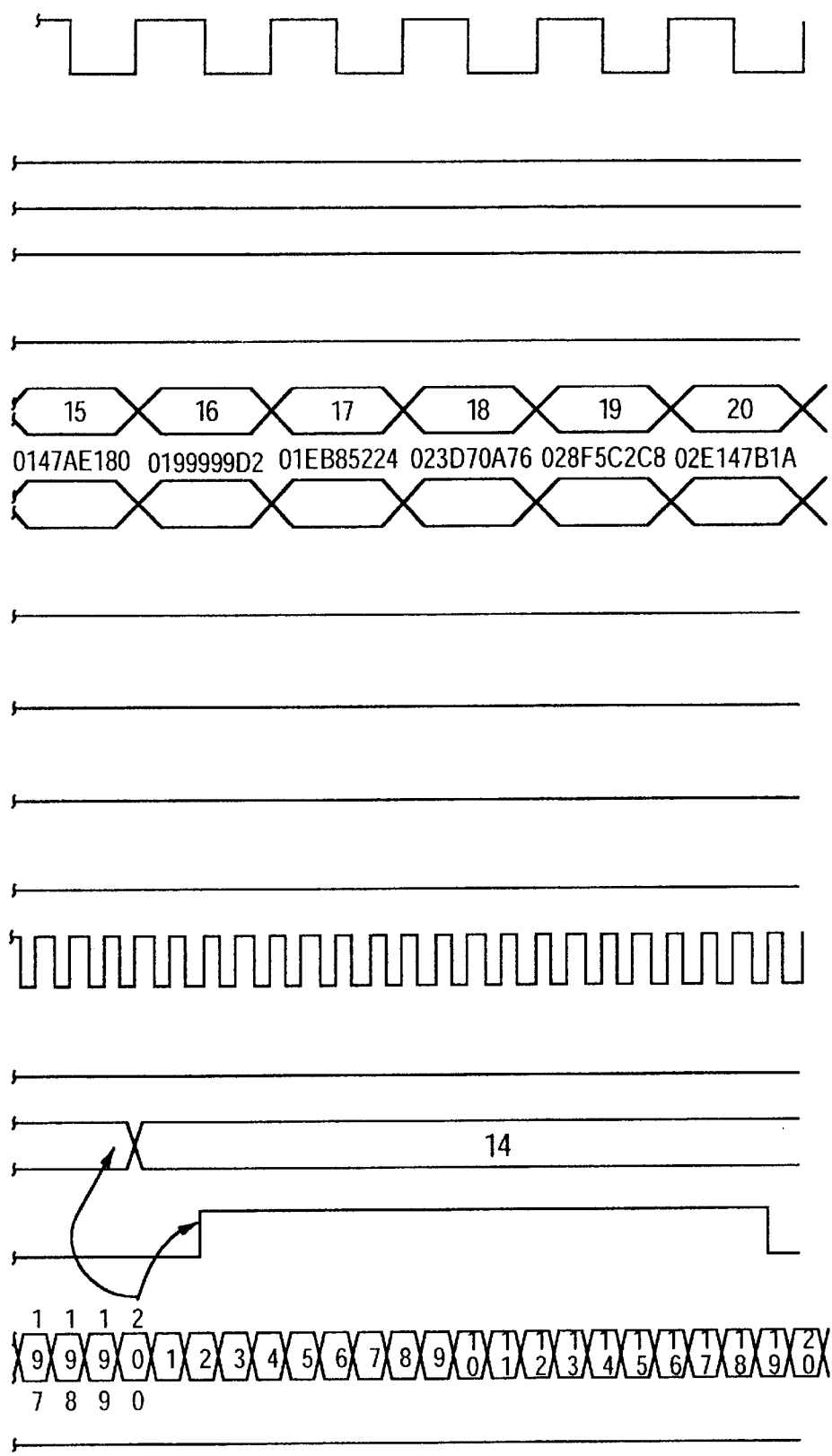
FIG. 15 -CONTINUATION

MULTI-SCAN VIDEO TIMING GENERATOR FOR FORMAT CONVERSION

BACKGROUND OF THE INVENTION

1. Field of the Invention

The invention relates generally to video display systems, and more particularly to a method and apparatus for converting an input video signal of a first viewable display resolution, pixel rate, and line rate, to a second output video signal of a second viewable display resolution, pixel rate, and line rate.

2. Description of the Related Art

There are numerous kinds of interlaced video signals such as NTSC and PAL, as well as progressive scan video signals such as computer video output VESA VGA, SVGA, XGA, and SXGA. These and other sources typically have different resolutions in terms of pixels per line, lines per frame, as well as different video timing in terms of horizontal line rate and vertical refresh rate. In order to accommodate many different types of input video signals for viewing on a single display device several methodologies have been adopted in the prior art.

A first prior art method involves adapting the operating format of the display device to match the resolution and video timing of the source input video. According to this method, the display device must be capable of adapting to different resolutions and video timings of the available input video sources. Therefore, this prior art methodology is commonly practiced with Cathode Ray Tube (CRT) devices which display video image data by modulating an electron beam intensity while sweeping the beam both horizontally and vertically across a phosphor coated viewing surface. The CRT can adapt to different input formats by detecting the input video source horizontal line and vertical frame rate and then automatically phase locking and adjusting the CRT display horizontal and vertical sweep rates to the detected input rates in order to maximize the active portion displayed on the viewing surface.

This first prior art method is not commonly used for displays wherein the viewable display region is made up of discrete image elements (pixels) arranged in a two dimensional matrix and wherein no horizontal and vertical beam sweep apparatus is provided which can be adjusted to accommodate different input formats. One class of such discrete pixel displays is referred to as Flat Panel Displays (FPDs) which includes Liquid Crystal Displays (LCDs), Field Emissive Displays (FEDs), Plasma Display Panels (PDPs), as well as many other emerging technologies.

A second prior art method of accommodating different types of input video signals for viewing on a single display device involves converting the source resolution and timing to a format that is supported by the display device. This prior art method converts the input source video format by means of pixel conversion, line conversion, and frame frequency conversion to a target video format that is supported by the target display device. Conventional format conversion circuits operate by taking a digital video signal, extracting the desired viewable or active portion of the video fields or frames, and storing the active portion into a frame buffer. The frame buffer provides elasticity so that the data write rate need not match the display read rate. The stored data is then read from the display frame buffer and processed to convert the number of pixels per image line, and the number of lines per image, to match those of the display device.

Such processing typically incurs latency between the time when source video data is available at the video source, and the time when the resulting processed data is available for output to the display device. It has also been common practice in some systems to process the data first before storing the data in the frame buffer. In either of these prior art processing scenarios, a display timing generator is provided which operates at the desired display line and frame rate and generates synchronizing signals to control the display as well as the transfer of processed frame buffer data to the display. The display timing generator produces timing for a different number of pixels per line and line rate than the video input source in order to achieve the format conversion. Also, by operating the display timing generator at a different frame rate than the video input source frame rate, a conversion of frame rates is achieved. Conventionally, such display timing generators are either synchronized on a frame by frame basis to maintain frame lock with the input video source, or are allowed to free run relative to the input video frame rate.

When the display timing generator is free running then the rate at which video input lines are required to be processed into display output lines may not match the display output line rate, and the difference between the actual input rate and the required input rate to sustain the processed display rate must be accommodated through memory buffering. Also, if the input and output frame or field rates do not match, then input frames or fields are either repeated or dropped by the frame buffer controller. This results in temporal artifacts for high motion sequences because of repeated or dropped input frames or fields being used as source data for processing into display frames. Also, when only a single frame of memory is provided in the memory buffer and the display frame rate is not locked with the input video frame or field rate then the input video data write pointer can cross paths with the display processing data read pointer creating the situation where a display frame may be comprised of image data processed from two different input frames captured at different points in time. This produces an objectionable artifact, usually referred to as "frame tear", in the display output when the source video contains high motion sequences as media content. Thus, if the display device can lock the display frame or field rate to the input video frame or field rate there are significant advantages because fields or frames no longer need to be repeated or discarded and temporal distortions in the display video sequence can be eliminated.

In the majority of pixel based displays, such as FPD devices, the individual pixel elements are selected or enabled through the use of an orthogonal scanned interface where pixel columns are selected based on a number of timing clock cycles relative to a horizontal sync signal or data enable signal, and a particular row of pixels is selected based on the number of horizontal sync or data enable pulses that have occurred relative to a vertical sync position. This column and row selection process enables a pixel or group of pixels to be refreshed.

In the case of format conversion, it has become common practice to frame lock a display timing generator with an input video source by allowing the display timing generator to free run from the start of the display vertical sync pulse, through the entire active region, to the vertical blanking front porch region. At this point, the display timing generator continues to scan blank lines until the input video vertical sync pulse causes the display timing generator to immediately jump to the start of the display vertical sync pulse. Then, the display timing generator returns to free run operation. Many pixel based displays can accommodate this step change to the display timing sequence since the individual pixel or groups of pixel elements are addressable in a sequential fashion relative to the synchronization pulses. Once the entire active region has been updated, the step change to timing in the vertical blanking front porch region, prior to the vertical synchronization pulse, does not visually affect the display. It is relatively easy to implement a "vertical reset" feature in a display timing generator. The other advantage to this technique is that the display timing generator can use a free running display pixel clock which need not be synchronized to the input video pixel clock, line rate, or frame rate.

However, a principal disadvantage of this technique is that since the display line rate is based on a free running pixel clock, there can be no exact relationship between the input line rate and the rate at which the input lines need to be processed to sustain the display output rate. Therefore, this implementation requires that enough memory be provided so that input video lines of data are available to sustain the display processing rate for the worst case difference between the input video line rate and the display output processing line rate. Thus, in many format conversion systems a full frame buffer or more of memory is provided. Another significant disadvantage is that this type of frame locking can not be used to drive a CRT type of display device since in many cases the step change to the display timing is of sufficient magnitude to cause the horizontal and vertical sweep phase lock loops of the CRT controller to lose lock and the resulting transient during lock acquisition causes noticeable artifacts on the resulting displayed video images.

Also, for applications requiring arbitrary image zoom or shrink processing of the active pixel data as part of the format conversion capability, large amounts of memory are required. Therefore, most arbitrary zoom or shrink systems are implemented with a full frame of memory or more.

For the standard application of converting input formats to a different output format where both formats have the same aspect ratio, the required image zoom or shrink is not entirely arbitrary and the ratio of active pixels to total pixels, and active lines to total lines, tends to remain constant for most input formats of the same aspect ratio. In this situation, using a free running display timing generator requires more memory than other possible implementations, even if it has vertical reset for frame synchronization.

One example of a display processor implementation is described in U.S. Pat. No. 5,600,347 in which a method is set forth for nonlinear horizontal expansion. However, this prior art patent does not deal with the synchronization issues discussed above relating to performing format conversion with a minimum amount of memory buffer.

Many discrete pixel displays such as FPD devices have undergone technological improvements that enable them to now support a range of frame refresh rates so that frame rate conversion may not be required in the future. Nonetheless, due to the discrete pixel nature of these devices there is still a requirement for apparatus to adapt the input source video pixel rate, line rate, and displayable format to match the fixed active pixel arrangement of the display device.

Therefore, a display timing generator implementation which supports free running modes in applications where a frame buffer is used for arbitrary zoom, shrink, or other image processing, is highly desirable. Preferably, such a display timing generator should also provide a frame lock implementation that minimizes the above-discussed step change to the display timing sequence, so that both discrete pixel display devices as well as CRT devices can be supported. The novel apparatus should implement a display timing generation technique that minimizes the memory buffer needed to support non-arbitrary zoom, shrink, or image processing operations for format conversions. As indicated above, such a display timing generator is highly desirable since it would reduce the costs of video processing systems and provide a common apparatus that could be utilized in many types of devices for converting images from a first input format to a second display format.

The following patents provide descriptions of the various prior art systems discussed above:

U.S. Pat. No. 4,275,421 entitled LCD CONTROLLER;

U.S. Pat. No. 4,872,054 entitled VIDEO INTERFACE FOR CAPTURING AN INCOMING SIGNAL AND REFORMATTING THE VIDEO SIGNAL;

U.S. Pat. No. 5,351,088 entitled IMAGE DISPLAY APPARATUS FOR DISPLAYING IMAGES OF A PLURALITY OF KINDS OF VIDEO SIGNALS WITH ASYNCHRONOUS SYNCHRONIZING SIGNALS AND A TIMING CORRECTION CIRCUIT;

U.S. Pat. No. 5,446,496 entitled FRAME RATE CONVERSION WITH ASYNCHRONOUS PIXEL CLOCKS;

U.S. Pat. No. 5,508,714 entitled DISPLAY CONTROL APPARATUS FOR CONVERTING CRT RESOLUTION INTO PDP RESOLUTION BY HARDWARE;

U.S. Pat. No. 5,517,253 entitled MULTI-SOURCE VIDEO SYNCHRONIZATION;

U.S. Pat. No. 5,534,883 entitled VIDEO SIGNAL INTERFACE;

U.S. Pat. No. 5,561,472 entitled VIDEO CONVERTER HAVING RELOCATABLE AND RESIZABLE WINDOWS;

U.S. Pat. No. 5,579,025 entitled DISPLAY CONTROL DEVICE FOR CONTROLLING FIRST AND SECOND DISPLAYS OF DIFFERENT TYPES;

U.S. Pat. No. 5,600,347 entitled HORIZONTAL IMAGE EXPANSION SYSTEM FOR FLAT PANEL DISPLAYS; and U.S. Pat. No. 5,585,856 entitled IMAGE PROCESSING APPARATUS THAT CAN PROVIDE IMAGE DATA OF HIGH QUALITY WITHOUT DETERIORATION IN PICTURE QUALITY.

SUMMARY OF THE INVENTION

A general object of an aspect of the present invention is to provide a method and apparatus for producing video signal timing for a display device that has a display format different from the input video format.

It is also an object of an aspect of the invention to provide a method and apparatus for producing video signal timing in cases where the input video line rate and display output line rates are not the same. It is also an object of an aspect of this invention to provide a method and apparatus for synchronizing the display output line rate to the input line rate so that the source video line input rate can sustain the rate at which the input lines are processed to generate display video lines using a minimum amount of memory buffer for a variety of display processing methods.

It is also an object of an aspect of the invention to provide a method and apparatus for synchronizing display output timing to input video timing such that both are locked in terms of frame rate, but skewed in terms of frame phase, in order to accommodate latency incurred by processing of source video data to generate the display video data. It is a further object of an aspect of the invention to provide a method and apparatus for adjusting the skew between the input source video frame timing and the display output video frame timing to accommodate latency for various types of display processing such as, but not limited to, scaling, video format conversion, and filtering operations.

In order to achieve the aforementioned objectives, according to the present invention there is provided a format converter for receiving a digital video input signal characterized by a first viewable display resolution, pixel rate and line rate, and in response generating a digital video output signal for viewing on a display characterized by a second viewable display resolution, pixel rate and line rate, said format converter comprising:

programming interface means for receiving operating mode information indicative of said first and second viewable display resolutions, pixel rates and line rates;

memory means for storing said digital video input signal;

display processor means for retrieving said digital video input signal from said memory means, selectively de-interlacing, filtering and scaling said digital video input signal, and in response generating said digital video output signal; and display timing controller means for deriving synchronization and control information from said digital video input signal based on said operating mode information received by said programming interface means, and in response controlling operation of said display processor means to generate said digital video output signal for display at said second viewable display resolution, pixel rate and line rate.

According to a further aspect of the present invention, the display timing controller further comprises:

clock generation means for generating a display main clock signal;

a lock event controller for generating a lock event signal at a predetermined instant of each frame of said digital video input signal; display synchronizer means for generating a display horizontal lock event signal and a display vertical lock event signal for controlling synchronization between said digital video input signal and said digital video output signal based on said lock event signal and said operating mode information; and display timing generator means for generating timing signals synchronized to said horizontal and vertical lock event signals to control said display processor means in accordance with said operating mode information.

Thus, according to the present invention, in the case of a digitized and decoded NTSC input source signal the incoming fields of NTSC data can be processed into a progressive scan format and used to drive VGA timing compatible displays, SVGA timing compatible displays, or XGA timing compatible displays. The display device can be either a CRT display device or a discrete pixel display device such as an FPD. If the display output device is capable of supporting a display frame rate that matches the input NTSC field rate then the amount of memory buffer required can be reduced to much less than that required to store a full NTSC field of active data.

In the case of a digitized and decoded PAL input source signal the incoming fields of PAL data can be processed into a progressive scan format and used to drive VESA VGA timing compatible displays, SVGA timing compatible displays, or XGA timing compatible displays. The display device can be either a CRT display device or a discrete pixel display device such as an FPD. If the display output device is capable of supporting a display frame rate that matches the input PAL field rate then the amount of memory buffer required can be reduced to much less than that required to store a full field of PAL active data.

In the case of a digitized VGA input source signal then the incoming frames of VGA data can be processed into a different format and used to drive VGA timing compatible displays, SVGA timing compatible displays, or XGA timing compatible displays. The display device can be either a CRT display device or a discrete pixel display device such as an FPD. If the display output device is capable of supporting a display frame rate that matches the input VGA frame rate then the amount of memory buffer required can be reduced to much less than that required to store a full VGA frame of active data.

Furthermore, according to the present invention many other digitized or digital video signals (interlaced or progressive scan) can be processed into different formats and used to drive display devices with different formats in terms of pixels per line and lines per frame.

Also, according to the present invention if the input digital video signal is to be converted to a different display frame rate, then display timing can be produced at a display frame rate that is not related to the input frame rate. However, in this case the memory buffer will require at least one input field or frame of memory.

In addition, according to the present invention the display output line rate can be a ratio multiple of the input pixel rate to minimize the amount of memory required for processing of input data to generate display output data. The display line period according to the invention varies in period by a +/− pixel periods on a line by line basis. Many FPD devices can accommodate this degree of line jitter. The method of line rate generation according to this aspect of the invention does not require a display pixel clock phase locked loop. Therefore, a free running oscillator can be used to generate the display timing thereby reducing system cost and complexity. Also, since the display line rate is synchronized to the input video line rate then a minimum of memory buffer is needed which can further reduce the system cost.

BRIEF DESCRIPTION OF THE DRAWINGS

A detailed description of the preferred embodiment is provided herein below with reference to the following drawings, in which.

DESCRIPTION OF THE PREFERRED EMBODIMENT

Figure 1:
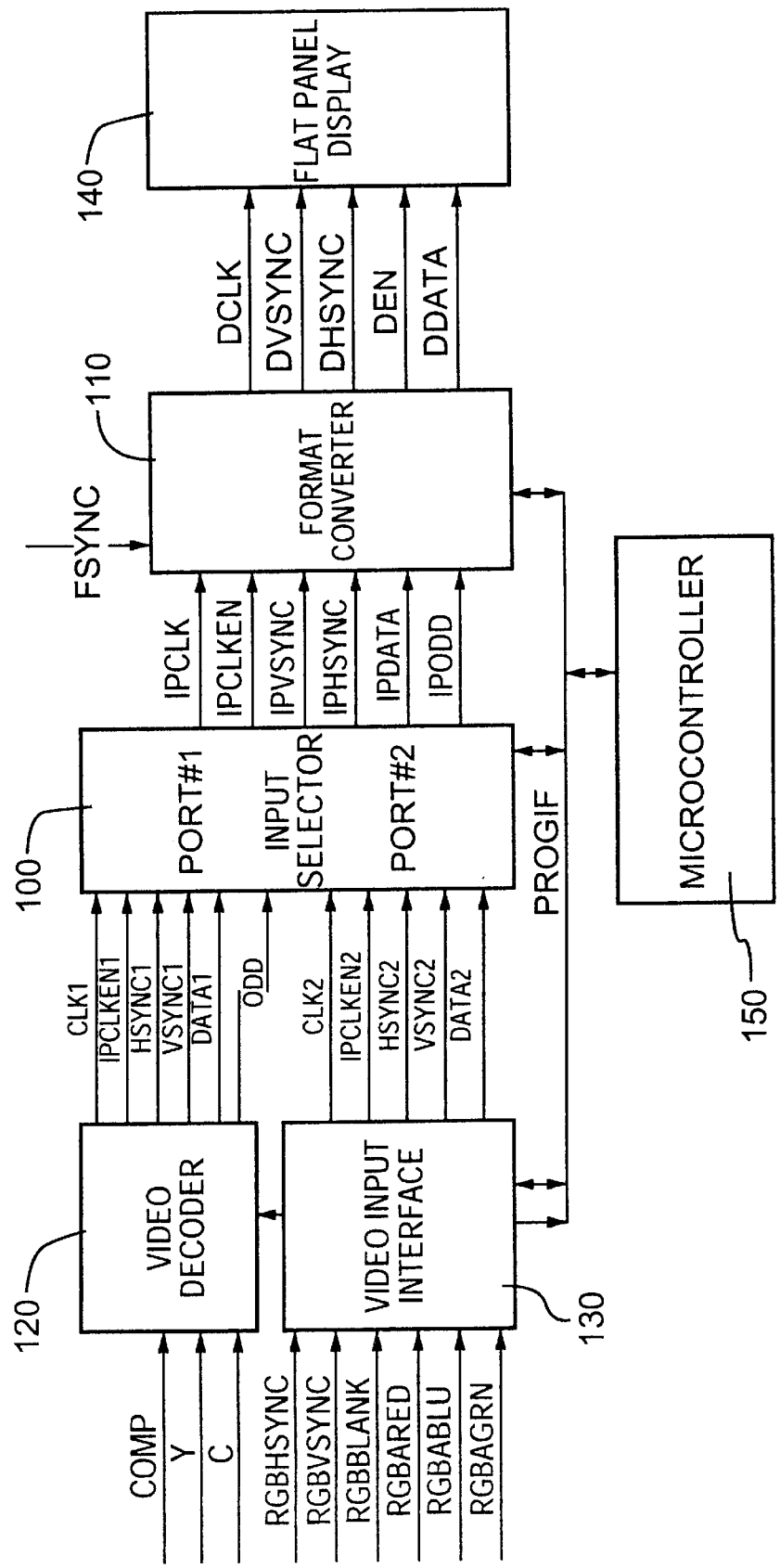
FIG. 1 is a block diagram of a multi-sync type discrete pixel display device with format conversion according to the present invention.

FIG. 1 is a block diagram showing the construction of a multi-sync type discrete pixel display device. The input selector 100 and format converter 110 of this diagram implement the format conversion feature according to the present invention. The video decoder 120 and video input interface 130 are well known devices, as is the microcontroller 150 and the actual flat panel display device 140. The format converter 110 has an external input frame synchronizing signal (FSYNC) which can be used to control display timing frame rate.

Figure 2:
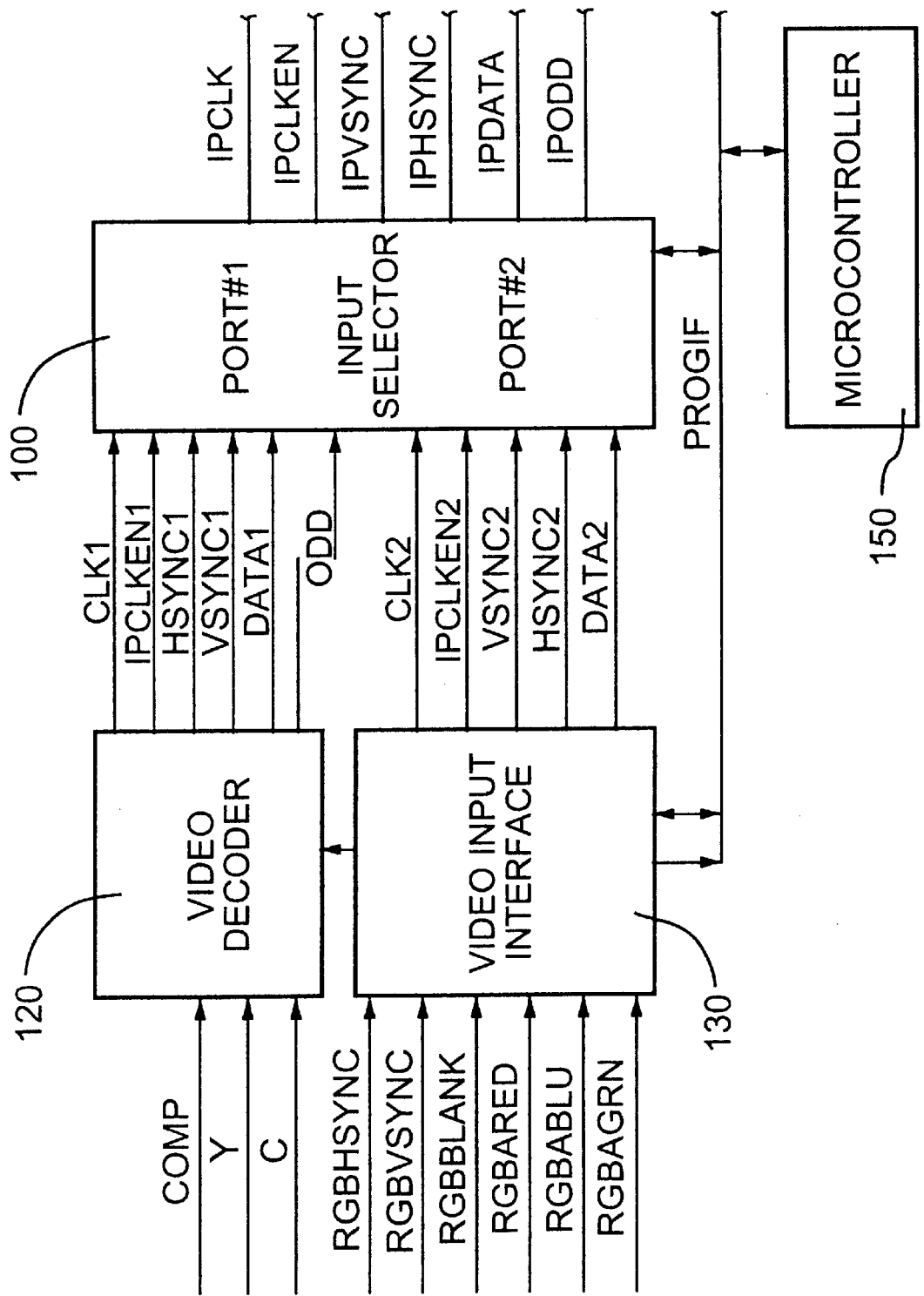
FIG. 2 is a block diagram of a multi-sync CRT device with format conversion according to the present invention.

FIG. 2 shows an embodiment of the invention applicable to a multi-sync CRT device. The input selector 100, format converter 110, video decoder 120, video input interface 130, and microcontroller 150 function in the same manner as the embodiment of FIG. 1. However, in this embodiment a digital to analog converter 155 is connected between the output of format converter 110 and a CRT display 160, in a well known manner. As will be apparent from the following description, the input selector 100 and format converter 110 according to the present invention are capable of controlling either a flat panel display such as display 140 in FIG. 1 or a CRT display such as display 160 in FIG. 2.

MICROCONTROLLER DESCRIPTION

The micro controller 150 shown in FIGS. 1 and 2 is used to program control registers within the display device components to determine the operating mode and operating parameters for selecting and converting the video source to the desired display output format for display on the targeted display device.

The micro controller 150 transfers operating parameters to the control registers in the various components and reads back any status information from those components by means of a programming interface (PROGIF) which is a conventional micro controller communication bus that can be implemented using a variety methods such as I²C, a microprocessor parallel address/data bus with chip selects, or serial peripheral interface (SPI). The embodiment presented herein uses a serial communication bus implementation as the micro controller programming interface (PROGIF) for communicating with the input selector 100 and format converter 110 and their respective programmable sub-components.

INPUT SELECTOR DESCRIPTION

The input selector 100 shown in FIGS. 1 and 2 provides the capability to selectively accept as input a digital video signal from two video sources, video decoder 120 or video input interface 130, each of which is connected to a respective video input port. Each of the digital video input signals comprises of a pixel clock (CLK1 and CLK2, respectively), a pixel clock enable (CLKEN1 and CLKEN2, respectively), a horizontal synchronizing signal (HSYNC1 and HSYNC2, respectively), a vertical synchronizing signal (VSYNC1 and VSYNC2, respectively), a shared odd field status flag (ODD) and a data bus signal (DATA1 and DATA2, respectively).

The first input port (referred to herein as Port #1) of input selector 100 is connected to video decoder 120 and accepts either 4:4:4 sampled RGB data or 4:2:2 sampled YUV data. The second input port (referred to herein as Port #2) of input selector 100 is connected to video input interface 130 and accepts 4:4:4 sampled RGB data. Either input port can accept as input both interlaced and progressive scanned input video signals. A single ODD field status flag is shared by the two ports and must be driven by the active input port (Port #1 or Port #2) when an interlaced scanned input video signal is used as input.

FIG. 1 and FIG. 2 show a video input interface 130 that provides progressively scanned input video on Port #2, so in this implementation the video input interface does not drive the ODD field status signal (ODD). However the input selector 100 can accept interlaced input video at Port #2 under control of the shared ODD field status.

Figure 5:
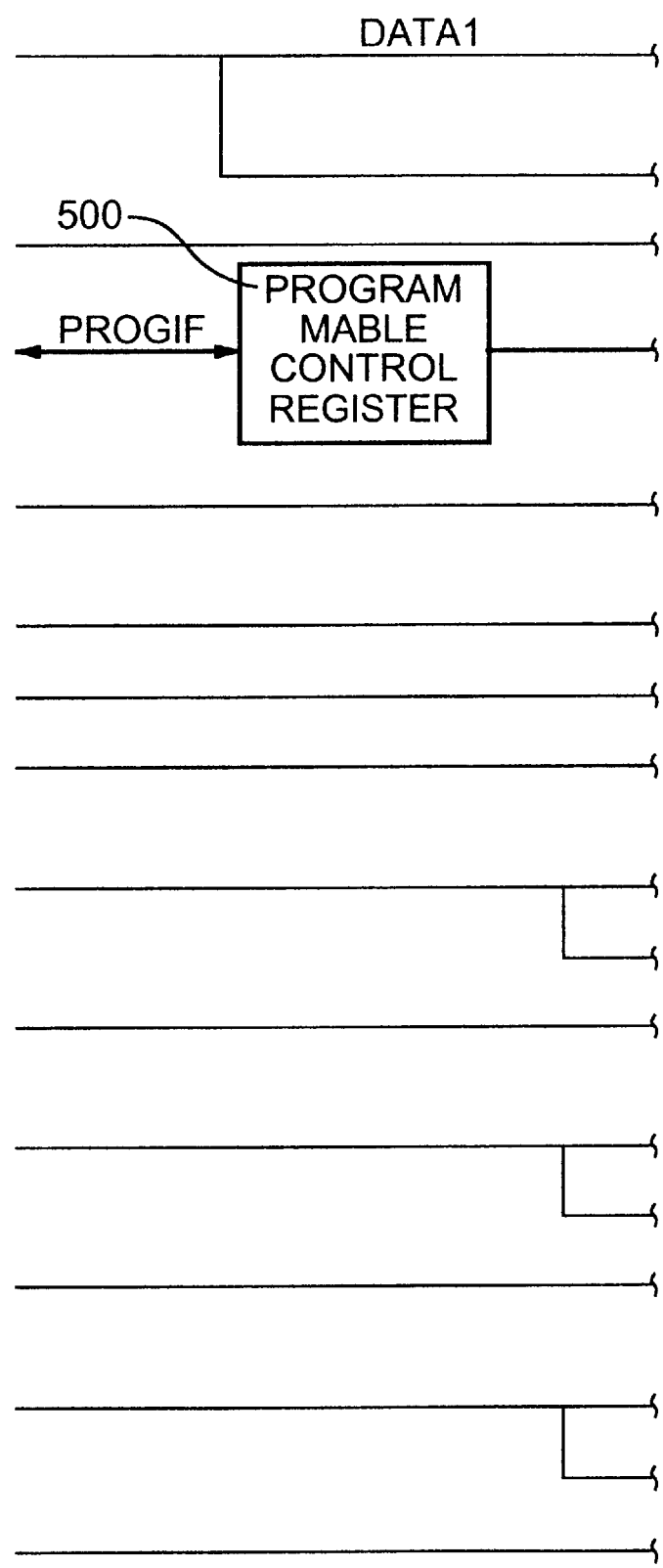
FIG. 5 is a block diagram of an input selector according to the preferred embodiment.

Turning to FIG. 5, the structure of input selector 100 is shown in greater detail. The input selector 100 processes 4:2:2 YUV (DATA1) data using a digital interpolator 505 to up sample the data stream in order to generate intermediate 4:4:4 YUV data. The 4:4:4 YUV data is then color space converted using a 3×3 multiplier matrix with fixed coefficients 510 to generate a 4:4:4 RGB data stream (RGB' 4:4:4') that is visually equivalent to the YUV data when displayed. The clock enable and synchronizing signals applied to Port #1 of input selector 100 are delayed through pipe lined storage elements 520, 535, 545, 555 to be latency aligned with the CSC processing delay of the color space converted 4:4:4 RGB data stream.

The Port #2 4:4:4 RGB data and control signals, the Port #1 4:4:4 RGB data and control signals, and the Port #1 color space converted RGB' 4:4:4' data and CSC processing delayed control signals are input to selectors 515, 525, 530, 540, 550, and 560 which pass one of the Port #1 or Port #2 digital video signals to the appropriate outputs IPDATA, IPODD, IPCLK, IPCLKEN, IPVSYNC and IPHSYNC. The IPDATA output is always in RGB 4:4:4 data format. The selectors 515, 525, 530, 540, 550 and 560 and controlled by a programmable control register 500 which is programmed by means of the micro controller programming interface (PROGIF) to select either Port #1 or Port #2 for input, and also to select either YUV 4:4:4 input data or RGB 4:4:4 input data operation when Port #1 is selected, and to additionally select either interlaced or progressive scan input operation.

When progressive scan input video is selected then the input ODD signal is ignored and the output IPODD signal is always driven active. When interlaced input video is selected then the input ODD signal indicates which field, ODD or EVEN, is being input and the output IPODD signal corresponds to the ODD input signal.

As will be appreciated from the foregoing, the functionality of the input selector 100 is implemented entirely by circuits and circuit configurations that are conventional in practice with the only exception being the configuration of two separate ports (i.e. Port #1 which accepts both YUV or RGB input and Port #2 which is dedicated to RGB input signals), and both ports accepting either interlaced or progressive scan inputs.

FORMAT CONVERTER DESCRIPTION

Figure 3:
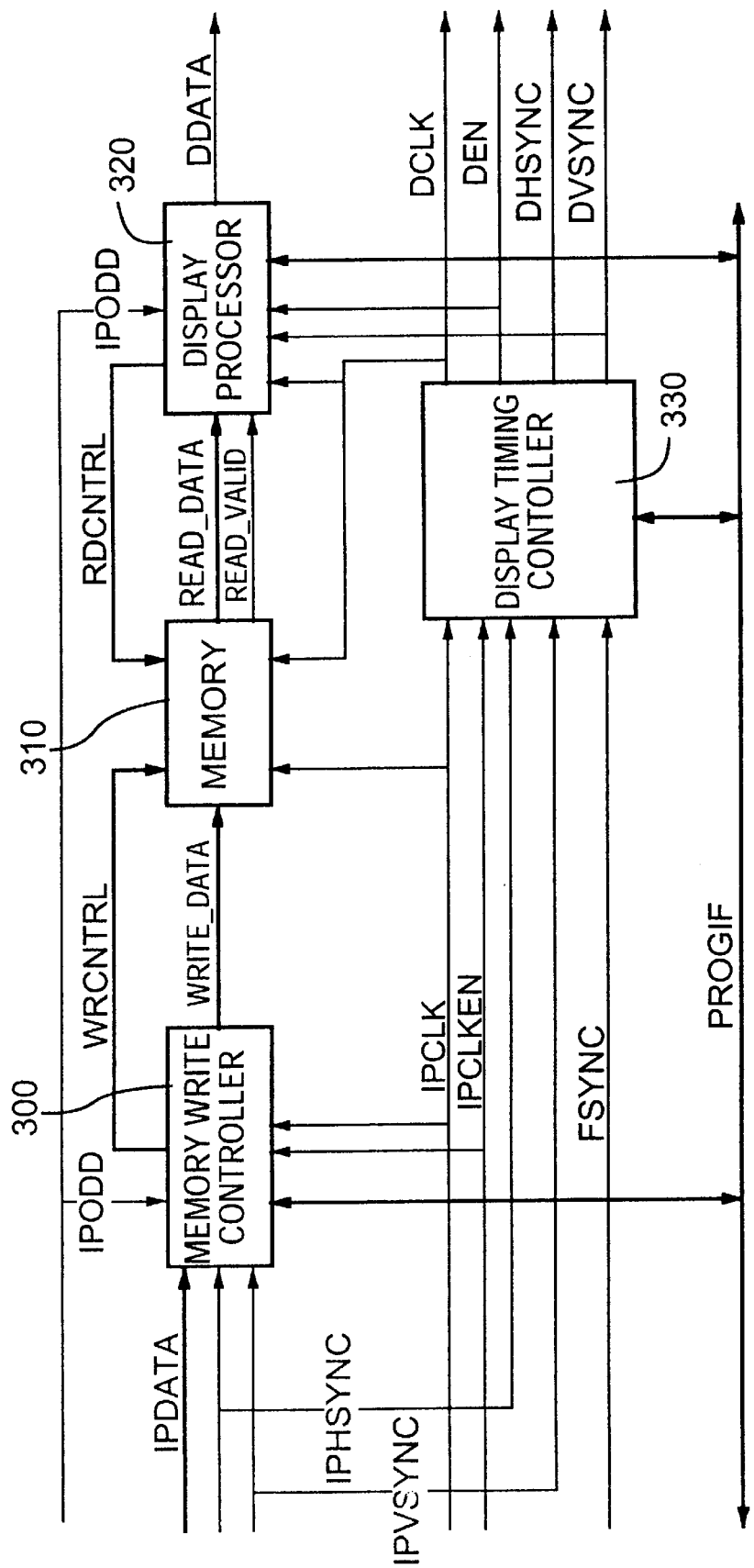
FIG. 3 is a block diagram of a format converter according to the present invention.

The format converter 110 provides the capability to accept as input a digital video input signal that has a first viewable display resolution, pixel rate, and line rate, and produces as output a second digital video signal that has a different display resolution, pixel rate, and line rate. As shown in FIG. 3, the format converter 110 consists of a memory write controller 300, memory 310, a display processor 320, and a display timing controller 330. The format converter 110 achieves the conversion from the input format to the display output format by processing input lines of pixel data using a de-interlacing, filtering, and scaling algorithm set forth in greater detail below, to generate the desired display output format.

MEMORY DESCRIPTION

A memory 310 is provided in the format converter data path in order to accommodate a video input clock (IPCLK) that can be running asynchronous to the display output clock (DCLK). Also, the memory 310 provides elasticity to accommodate differences between the video input line rate and the rate at which input lines are consumed by the display processing circuitry of the present invention for generating the display output. Memory 310 also provides means for restructuring the input video frame or field scanning so as to support predetermined display processing input data requirements. For example, vertical linear interpolation requires two adjacent input lines to be available for the bi-linear interpolator to generate each display output line, as discussed in greater detail below.

The memory 310 can be easily implemented using conventional FIFO, DRAM, EDO RAM, SDRAM, WRAM, GRAM, or SRAM technology. According to the preferred embodiment, an array of SRAM is used such that individual SRAM memory banks can be allocated for write operations which occur synchronously to the input pixel clock under control of write control signals (WRCNTRL). Meanwhile, other individual SRAM memory banks can be allocated for read operations synchronous to the display clock (DCLK) and display read control signals (RDCNTRL) generated by the display processor 320. The various ones of the memory banks can be individually allocated for write or read operations synchronous to the respective input video clock (IPCLK) or the display clock (DCLK).

MEMORY WRITE CONTROLLER DESCRIPTION

The purpose of the memory write controller 300 is to store incoming video data into the memory as a series of video lines that can then be addressed and read by the display processor 320.

The memory write controller 300 accepts as input the digital video data (IPDATA), clock (IPCLK), clock enable (IPCLKEN), field status (IPODD) and synchronization control signals (IPHSYNC and IPVSYNC) from the input selector 100 (FIG. 5).

The memory write controller 300 counts the number of IPHSYNC pulses relative to the IPVSYNC pulse to determine the start and duration of the input video vertical active region in terms of input lines. The memory write controller is programmable using the micro controller programming interface port (PROGIF) to determine the start line location and duration of the vertical active region in terms of input lines. Two start line locations are supported, one for odd fields and one for even fields. The memory write controller can be programmed to select either interlaced input or progressive scan input video operation by means of the PROGIF port. For progressive scan input video only the programmed active line start location corresponding with ODD fields is used. During interlaced scan input the IPODD signal determines which of the programmed active line start (ODD or EVEN) is used to determine the starting line of the input video active region.

The memory write controller 300 also counts the number of IPCLK cycles relative to the IPHSYNC pulse to determine the input video horizontal active region in terms of IPCLK cycles. Only IPCLK cycles during which IPCLKEN is active are counted. Cycles during which IPCLKEN is not active are ignored. The memory write controller is programmable using the micro controller programming interface (PROGIF) to determine the start and duration of the video horizontal active region in terms of IPCLK cycles.

The active region is defined as the region in the video input field or frame where both horizontal and vertical active regions are true. During the active region time intervals the memory write controller samples the data inputs during IPCLK cycles if IPCLKEN is active to acquire active data. This sampled input active data is produced at the memory write controller WRITE_DATA output in order to be written into the memory 310.

The memory write controller 300 also produces addressing information, memory bank select signals, and a write enable signal (collectively designated as WRCNTRL in FIG. 3) to enable writing of input data into the memory 310 during those cycles where the memory write controller is producing valid active data on the WRITE_DATA signal outputs as controlled by the IPCLKEN signal and decoded active region. According to the preferred embodiment, simple linear binary counters generate the addressing information and are controlled on a clock by clock basis by the input clock enable signal (IPCLKEN) to allow stalling on a pixel by pixel basis to support input video streams where each clock period (IPCLK) may not necessarily contain valid input data. The illustrated embodiment also contains a simple state controller which produces a write enable output signal to control writing of data to the memory 310 in order to maintain synchronization with the write address and bank select signals (WRCNTRL) and active output data (WRITE_DATA). The state controller also generates memory bank select signals which select individual memory banks for write operations sequentially in a circular buffer sequence. An input active pulse on IPVSYNC initializes the state controller to the empty state such that the first bank of the memory is selected for writing the first video line of input data at the start of each input field or frame.

DISPLAY PROCESSOR DESCRIPTION

The display processor 320 provides means for generating address and control signals (RDCNTRL) to control the reading of data from the memory 310. The data produced during memory 310 read operations (READ_DATA) is utilized by the display processor 320 which implements an image de-interlacing, filtering, and scaling algorithm to produce the display output data (DDATA).

The display processor is programmable by means of the micro controller programming interface (PROGIF) to enable or disable the de-interlacing function and to adjust the scaling and filtering function to produce the desired output image resolution from image data read from the memory 310.

When de-interlacing is enabled the IPODD input signal determines how the input data fields (READ_DATA) are processed in terms of the vertical offset between interlaced video fields. When de-interlacing is disabled then the IPODD input signal is ignored and image data read from memory is processed as frames.

The display processor 320 is initialized to begin processing a new display frame whenever the display timing controller 330 initiates a new display frame by means of the display vertical sync pulse (DVSYNC). The display processor then requests the first lines of image data from the memory 310 by supplying address, bank selects and activating the read enable signal to the memory (collectively as RDCNTRL). The memory responds with the image data (READ_DATA) and a data valid signal (READ_VALID) whenever the requested data is available. The display processor can be stalled by the data valid signal (READ_VALID) as required by the memory. The display processor pre-fills the entire display processing data path up until the output stage which drives DDATA. Once the display processing data path has pre-filled it is then also controlled on a clock by clock basis by the display timing controller 330 data enable (DEN) signal to ensure that the display output data is aligned with the active region. The memory provides data (READ_DATA) at a sufficient rate to support display processing to generate contiguous horizontal active regions of display data at the display outputs (DDATA). The display timing generator is programmed by means of the micro controller programming interface (PROGIF) to set the latency between the input video frame or field timing start of active region relative to the display output timing start of active region such that it matches the latency through the memory write controller 300, memory 310, and display processor 320 in order to prevent overflowing or under flowing the memory during the format conversion process.

DISPLAY TIMING CONTROLLER DESCRIPTION

Figure 4:
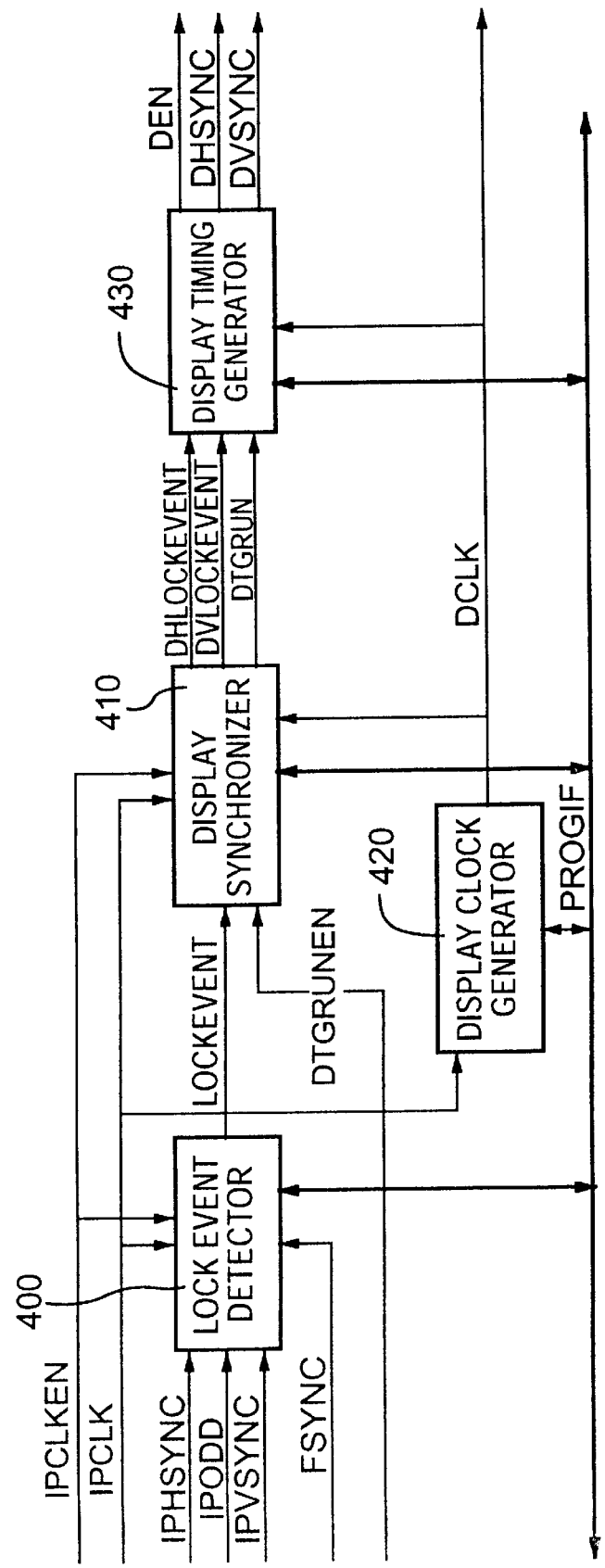
FIG. 4 is a block diagram of a display timing controller of the format converter according to the preferred embodiment.

The display timing controller 330 of FIG. 3 is shown in greater detail in FIG. 4 comprising a lock event generator 400 for determining a synchronizing event (LOCKEVENT) from the input video frame timing to which the display timing is to be locked, a display synchronizer 410 for generating synchronizing signals (DHLOCKEVENT and DVLOCKEVENT) for controlling the phase relationship between the display frame phase relative to the input lock event (LOCKEVENT) and in one mode (Line Synchronized Mode) also for controlling the display line rate as a function of the input master clock (IPCLK), a display clock generator 420 for producing the display master clock (DCLK) as a function of either an internally generated free running clock or the input video master clock (IPCLK), and a display timing generator 430 for generating display video timing based upon the display master clock (DCLK) and the synchronizing signals generated by the display synchronizer 410.

DISPLAY CLOCK GENERATOR DESCRIPTION

Figure 7:
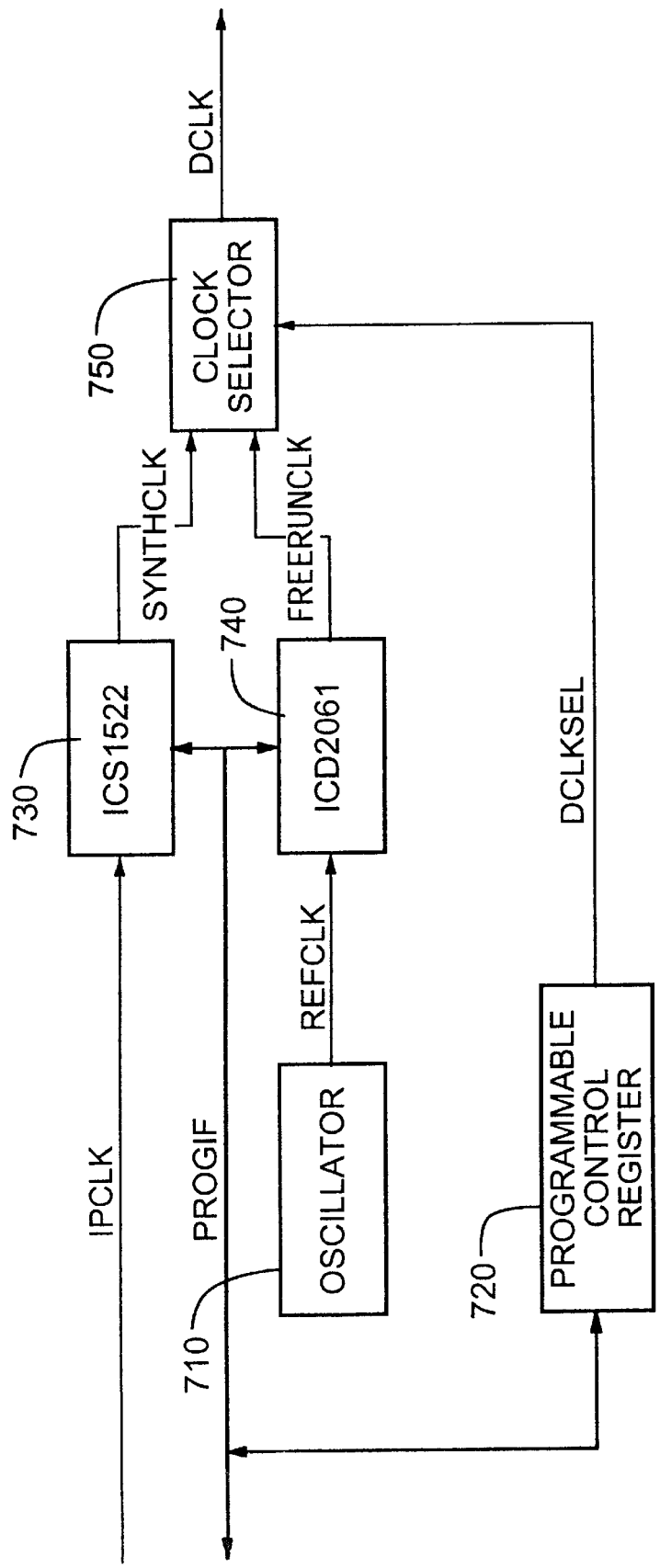
FIG. 7 is a block diagram of a display clock generator according to the preferred embodiment.

The display clock generator 420 is shown in greater detail with reference to FIG. 7, consisting of a free running oscillator source 710, an ICD2061 frequency synthesis phase lock loop 740, a second frequency synthesis phase lock loop 730 implemented using a ISC1522, and a clock selector 750 controlled by a programmable control register 720 to select either the free running clock or a ratio multiple of the input clock to be output by the display clock generator 420 as the display main clock (DCLK).

The free running oscillator source 710 produces a free running clock (REFCLK) that is not synchronized to the input video signal. This oscillator is implemented using a conventional oscillator implementation which provides the reference clock to the ICK2061 740 which multiples the reference clock by a ratio multiple to produce a first available display clock (FREEUNCLK) which is free running relative to the input video source. This free running display clock source is used when operating the display synchronizer 410 in line sync or free run modes when the display output frame timing does not need to be synchronized to the input frame timing by means of IPCLK to DCLK synchronization. The ICD2061 740, is programmable by means of the micro controller programming interface (PROGIF) for determining the ratio multiple.

The second frequency synthesis phase lock loop is implemented using an ICS1522 730, which multiples the video input main clock by a frequency synthesis ratio to produce a second display available display clock which is synchronized to the input video source. The ICS1522 is programmable by means of the micro controller programming interface (PROGIF) to control the multiply ratio for producing the desired DCLK from the IPCLK. This synchronized display clock source is used when operating the display synchronizer in frame lock mode, to synchronize the display output line timing with the input line timing in order to minimize the amount of memory 310 and to minimize any transients to the display timing during frame locking corrections to the display timing.

The clock selector selects either the first display clock source or the second display clock source to drive the DCLK output to the display synchronizer 410, display timing generator 430, memory 310, display processor 320, and the format converter 110 display output interface. The selection is controlled by means of a programmable control register 720 which is programmed by means of the micro controller programing interface (PROGIF).

The resulting display clock (DCLK) controls the clock rate at which memory read operations and display processing operations are performed, the rate at which the display timing generator synchronization signals are generated, as well as the rate at which display data and control information is transferred from the format converter 110 to the display device.

LOCK EVENT GENERATOR DESCRIPTION

Figure 6:
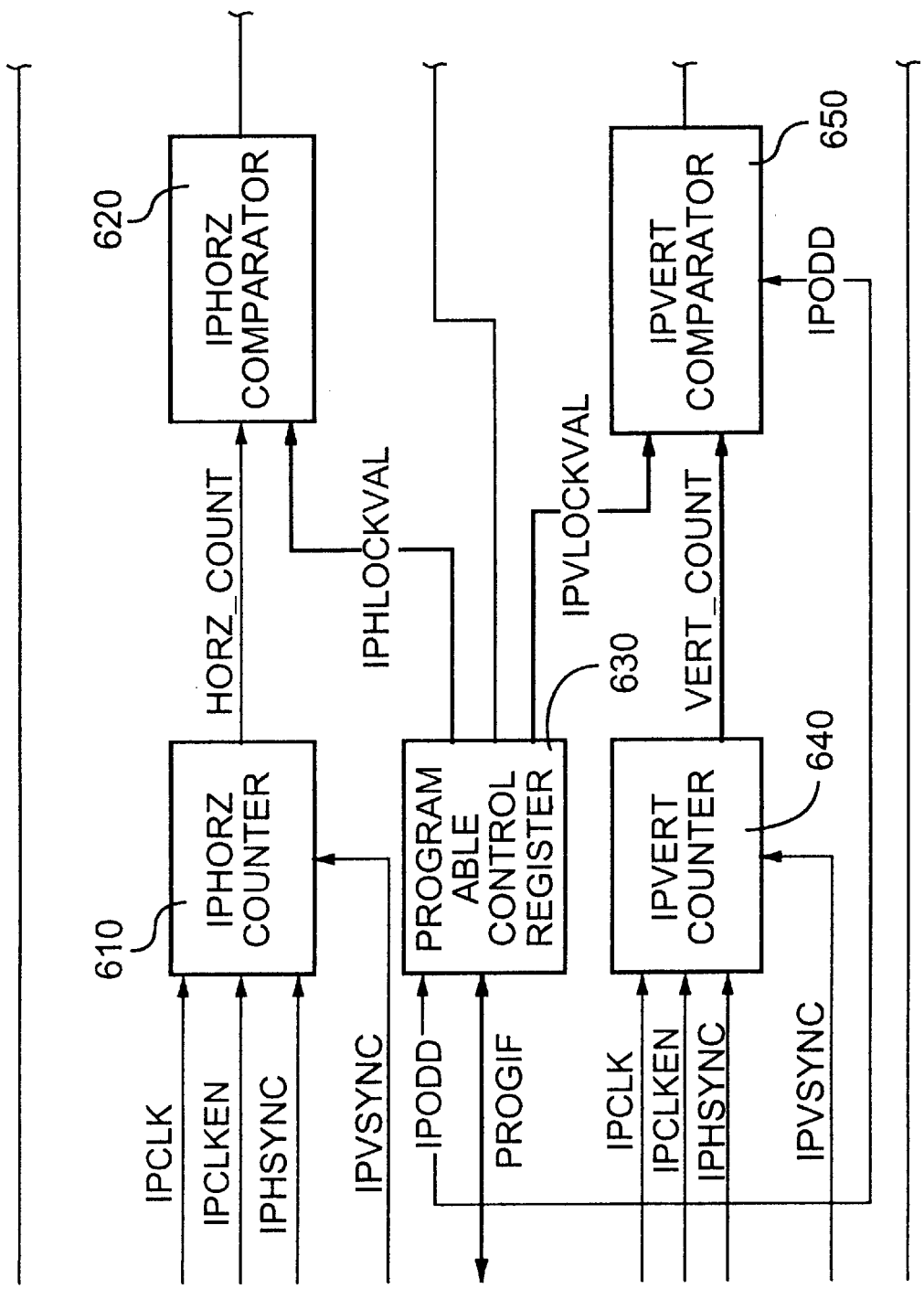
FIG. 6 is a block diagram of a lock event generator according to the preferred embodiment.

The lock event generator 400 is shown in greater detail with reference to FIG. 6 comprising a horizontal pixel event counter 610, a horizontal pixel event comparator 620, a vertical line event counter 640, a vertical line event comparator 650, a programmable control register 630 for selecting the location in the input frame timing where the horizontal and vertical events are to occur, a lock event generator circuit 660, and a lock event selector 670.

The horizontal pixel event counter 610 counts the number pixel clock cycles (IPCLK) relative to when an input horizontal synchronization pulse (IPHSYNC) is detected. Only pixel clock cycles during which IPCLKEN is active are counted. Pixel clocks where IPCLKEN is not active are not counted. The horizontal pixel count is compared in comparator 620 with a programmable horizontal lock event value (IPHLOCKVAL). When the horizontal pixel count is equal to the programmable horizontal lock event value, then a horizontal lock event pulse (IPHLOCKEVENT) is produced by the comparator 620. The horizontal lock event pulse indicates that the input digital video timing is at a predetermined point of an input line.

The vertical line counter 640 counts the number of input horizontal synchronization pulses (IPHSYNC) relative to when an input vertical synchronization pulse (IPVSYNC) is detected. Thus, the vertical line counter counts video input lines. The vertical line count is compared in comparator 650 with a programmable vertical lock event value (IPLOCKVAL). When the vertical line count and the programmable vertical lock event value are equal and the IPODD input signal is active, then the comparator 650 produces active pulse on the vertical synchronization signal output (IPVLOCKEVENT). The vertical lock event pulse indicates that the input digital video timing is at a predetermined line of an input frame. The IPODD signal ensures that only one vertical lock event (IPVLOCKEVENT) pulse occurs for every input frame.

The programmable control register 630 has as an input field select signal (IPODD). The IPODD signal indicates which input field is active for input digital video sources where the lines are scanned using an interlaced video format. For input digital video sources where the lines are scanned using a progressive scan format, then the ODD signal is held in the active state by the driving source, the source being the input selector 100.

Whenever the vertical lock event (IPVLOCKEVENT) and horizontal lock event (IPHLOCKEVENT) pulses coincide the lock event generator 660 produces an active pulse on the signal HVLOCKEVENT.

The lock event selector 670 selects either the HVLOCKEVENT signal or the FSYNC signal as the source of the output LOCKEVENT signal according to the DFSYNCEN select control signal. DFSYNCEN is generated by the programmable control register 630 according to a control register word provided by means of the micro controller programming interface (PROGIF). This provides the additional capability for controlling the synchronization of the display output timing directly by the DFSYNC external input signal.

The lock event is a single pulse which occurs once per video input frame which can then be used to synchronize the display output frame rate to the input frame rate.

Since interlaced formats use a ½ line offset between the input odd or even fields, in order to achieve interleaving of the active lines to produce complete frames, then an obvious adaptation of the above-described lock event controller is to add the ability to generate a lock event once per field during interlaced video input. To do this every other field would have the lock event delayed by ½ of an input line period in order to maintain a constant period between lock events.

DISPLAY SYNCHRONIZER DESCRIPTION

Figure 8:
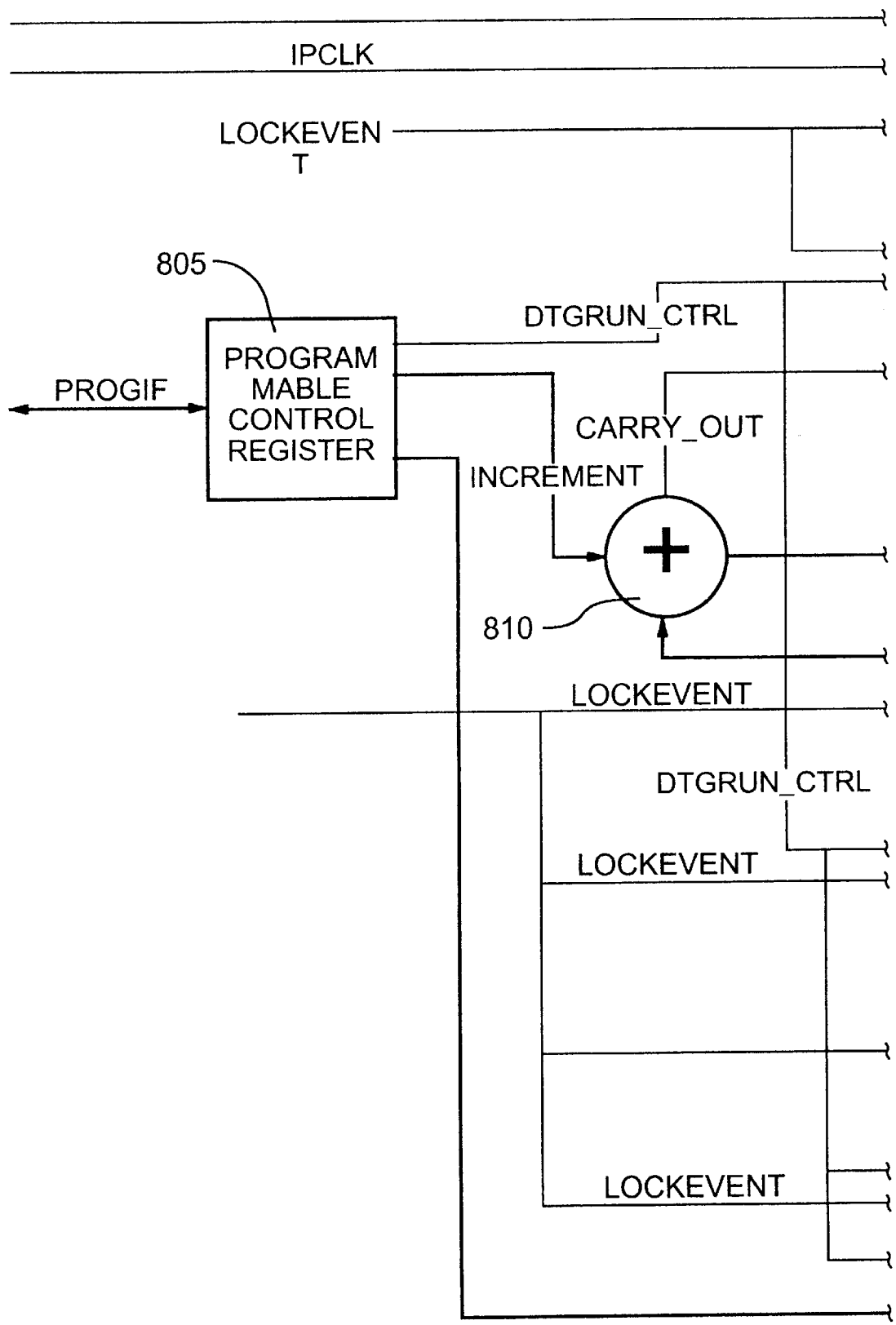
FIG. 8 is a block diagram of a display synchronizer according to the preferred embodiment.

The display synchronizer 410 is shown in greater detail with reference to FIG. 8 for accepting as inputs the input main clock (IPCLK) from the video input, the display clock (DCLK) from the display clock generator 420, and the lock event pulse (LOCKEVENT) from the lock event generator 400 as well as a micro controller programming interface (PROGIF) from the micro controller 150.

The display synchronizer 410 is structurally composed of a programmable control register 805, an adder 810, an accumulate register 825, display horizontal lock load gate 815, an adder carry output register 820, a display vertical lock load gate 830, a display timing generator run enable gate 835, a display horizontal lock load selector 840, a display horizontal lock load re-synchronizer 855, a display vertical lock load selector 845, a display vertical lock load re-synchronizer 860, a display timing generator run selector 850, and a display timing generator run re-synchronizer 865.

The programmable control register 805 is programmable by means of the micro controller programming interface (PROGIF). The programmable control register determines the state of the display timing generator enable (DTGRUN_CTRL), the display line rate control value (INCREMENT), and the mode selection (MODECTRL).

The display synchronizer 410 produces three output signals; display horizontal lock event (DHLOCKEVENT), display vertical lock event (DVLOCKEVENT) and display timing generator run (DTGRUN). The display horizontal and vertical lock event signals are used to force synchronization of the display timing generator 430 with the video input signal according to the selected operating mode of the display synchronizer 410. The DTGRUN control signal is used for start-up synchronization of the display timing generator and a disable for halting the display timing generator.

The timing synchronizer 410 supports four fundamental operating modes and is programmable to select one of these modes which determines the method for synchronizing the display timing generator 430 with the input video source. The operating modes supported are as follows: Free run Mode, Clock Synchronized Mode, Frame Synchronized Mode and Line Synchronized Mode.

FREE RUN MODE DESCRIPTION

The display synchronizer 410 operates in FREE RUN MODE according to the MODECTRL signal. FREE RUN MODE provides the ability to allow the display timing to be generated independently of any input video source with the timing based on a free running clock source and no synchronization as supplied by the display synchronizer 410. This mode is for use in format converter systems where a frame buffer is used to de-couple the display frame rate from the input video rate by means of a frame buffer situated between the input video source and the input selector 100 of the format converter. The frame buffer would in this case supply video data and synchronization signals to the input selector 100 at a rate that is synchronized to the display output frame rate.

When FREE RUN MODE is active, then the DTGRUN SELECT 850 directly controls the state of IDTGRUN as a function of DTGRUN_CTRL. The IDTGRUN signal is then re-synchronized from the input clock domain (IPCLK) to the display clock domain (DCLK) by means of DTGRUN RESYNC 865 to generate an output DTGRUN signal that is synchronous to the display clock (DCLK) for the purpose of enabling or disabling the display timer generator 430.

Figure 11:
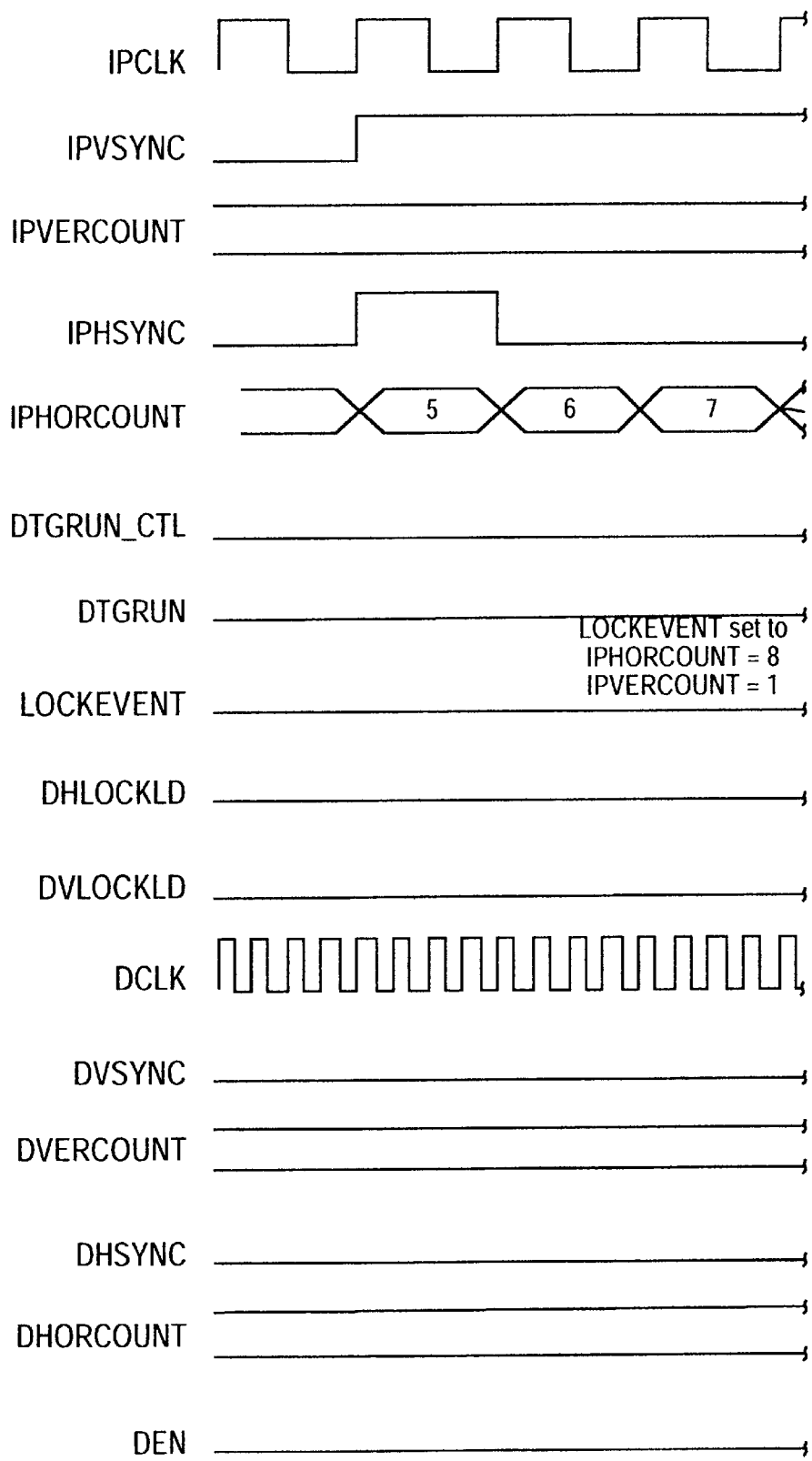
FIG. 11 is a timing chart which shows free run mode display timing startup according to the present invention.

The DTG_RUN output signal is produced from the DTGRUN_CTRL signal. When the programmable control register de-asserts the DTGRUN_CTRL signal then the DTGRUN output signal de-asserts to disable the DISPLAY TIMING GENERATOR from generating display timing. When the programmable control register asserts the DTGRUN_CTRL input signal then the DTG_RUN signal is asserted to enable the DISPLAY TIMING GENERATOR to begin generating display timing, as shown in FIG. 11.

Figure 12:
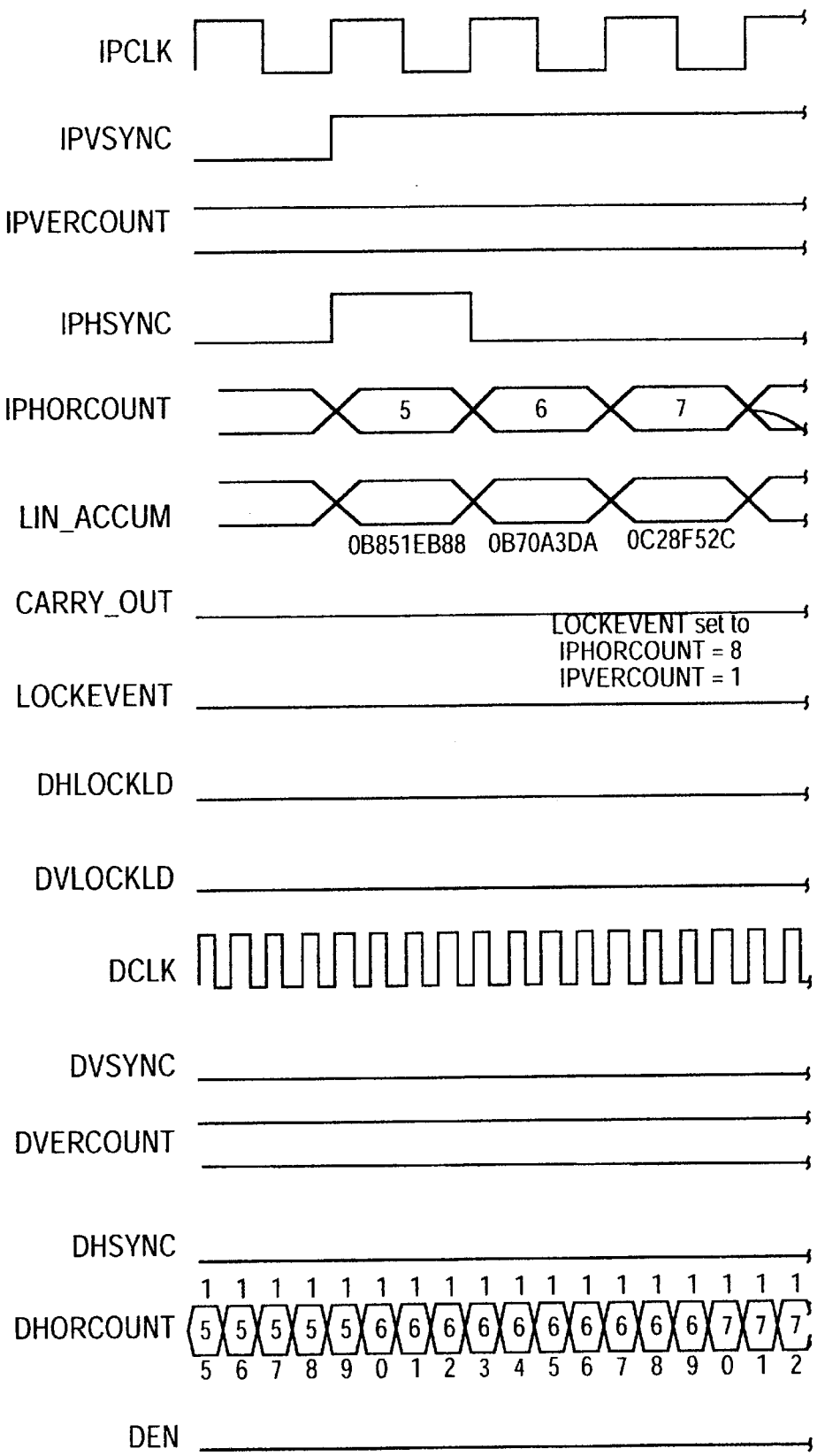
FIG. 12 is a timing chart which shows free run mode display timing during an input lock event according to the present invention.

Also when FREE RUN MODE is active, then the display synchronizer 410 does not activate the DHLOCKEVENT or DVLOCKEVENT output signals. Thus, there is no synchronization of display video timing with the input video timing by means of the display synchronizer 410 when in this mode, as shown in both of FIGS. 11 and 12.

CLOCK SYNCHRONIZED MODE DESCRIPTION

The display synchronizer 410 operates in CLOCK SYNC MODE according to the MODECTRL signal.

When CLOCK SYNC MODE is active, then the DTGRUN GATE 835 produces the signal OTHER_ DTGRUN as a function of the DTGRUN_CTRL signal and the input signal LOCKEVENT. The signal OTHER_ DTGRUN remains in the not active state until, firstly, the DTGRUN_CTRL signal is activated, and secondly, an active pulse follows on the LOCKEVENT input signal. Once in the active state, the OTHER_DTGRUN signal remains in the active state until the DTGRUN_CTRL signal is driven to the not active state, which causes OTHER_ DTGRUN to also return to the not active state. Thus, OTHER_DTGRUN is a form of DTGRUN signal that only can transition to the active state synchronous to a LOCKEVENT.

When CLOCK SYNC MODE is active, then DTGRUN SELECT 850 will select the OTHER DTGRUN signal as the source for the IDTGRUN signal. IDTGRUN is then re-synchronized from the input clock domain (IPCLK) to the display clock domain (DCLK) by means of DTGRUN RESYNC 865 to generate an output DTGRUN signal that is synchronous to the display clock (DCLK) for the purpose of enabling or disabling the display timing generator 430.

Also, when CLK SYNC MODE is active then the DHLOCKLD GATE 815 holds the CLKSYNC_DHLOCKLD signal in the not active state until, firstly, DTGRUN_CTRL transitions from the not active to the active state, and secondly, an active pulse is detected on the LOCKEVENT input signal. This causes the DHLOCKLD GATE 815 to pass the first LOCKEVENT pulse through to the CLKSYNC_DHLOCKLD signal. Subsequent LOCKEVENT pulses do not cause a CLKSYNC_DHLOCKLD while CLKSYNC_MODE remains in the active state.

When MODECTRL selects CLK SYNC MODE then the DHLOCKLD SELECT 840 selects the CLKSYNC_ DHLOCKLD signal to pass through and drive the IHLOCKLD signal which is then re-synchronized from the input clock domain (IPCLK) to the display clock domain (DCLK) by DHLOCKLD RESYNC 855 to generate the output signal DHLOCKEVENT.

Also, when CLK SYNC MODE is active, then the DVLOCKLD GATE 815 holds the CLKSYNC_ DVLOCKLD signal in the not active state until firstly, DTGRUN_CTRL transitions from not active to the active state, and secondly, an active pulse is detected on the LOCKEVENT input signal. This causes the DHLOCKLD GATE 815 to pass the first LOCKEVENT pulse through to the CLKSYNC_DVLOCKLD signal. Subsequent LOCKEVENT pulses do not cause a CLKSYNC_DVLOCKLD while CLKSYNC_MODE remains in the active state.

When MODECTRL selects CLK SYNC MODE then the DVLOCKLD SELECT 840 selects the CLKSYNC_ DVLOCKLD signal to pass through and drive the IVLOCKLD signal which is then re-synchronized from the input clock domain (IPCLK) to the display clock domain (DCLK) by DVLOCKLD RESYNC 860 to generate the output signal DVLOCKEVENT.

The CLK SYNC MODE provides a means for forcing the display video timing to synchronize to a lock event in the input video timing initially on start up but allows the display video timing to free run once started. The CLK SYNC MODE is useful for format conversion systems where the display main clock is synthesized using a frequency synthesis phase lock loop such that the resulting display frame timing matches the input video timing exactly. Thus, the display frame timing is synchronized to the input video frame initially on start up and the display clock phase lock loop maintains frame synchronization from that point on.

An obvious supplement to CLK SYNC MODE is the capability to detect the loss of lock in the display phase lock loop or loss of input video timing to display timing phase lock for the purpose of initiating re-synchronization by means of re-starting the CLK SYNC mode or switching to FRAME SYNC MODE (discussed in greater detail below).

LINE SYNCHRONIZED AND FRAME SYNCHRONIZED MODE DESCRIPTIONS

The display synchronizer 410 operates in one of either LINE SYNC MODE or FRAME SYNC MODE according to the MODECTRL signal.

Figure 13:
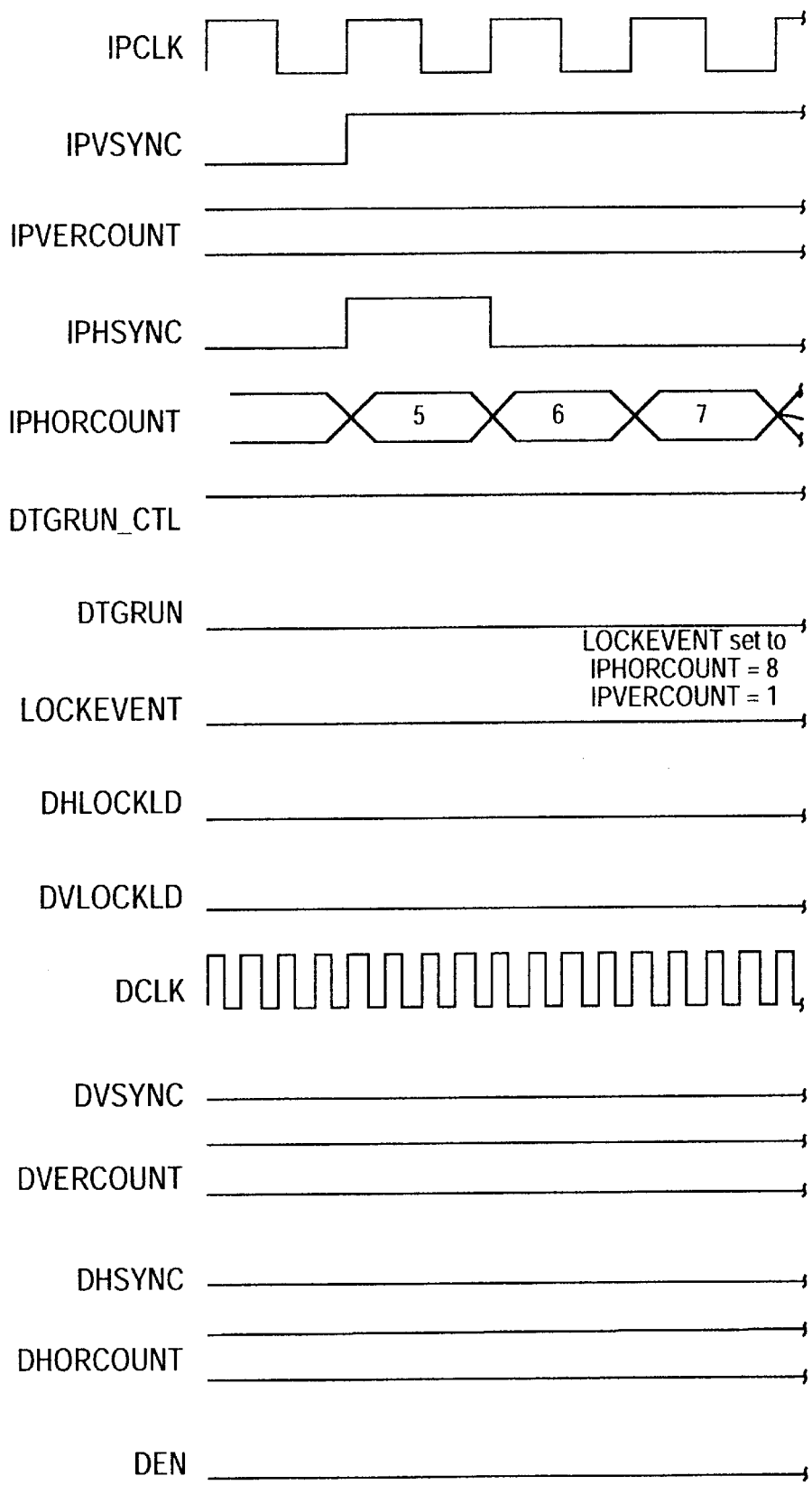
FIG. 13 is a timing chart which shows display timing generation start up for frame locked mode or for line synchronized mode according to the present invention.
Figure 14:
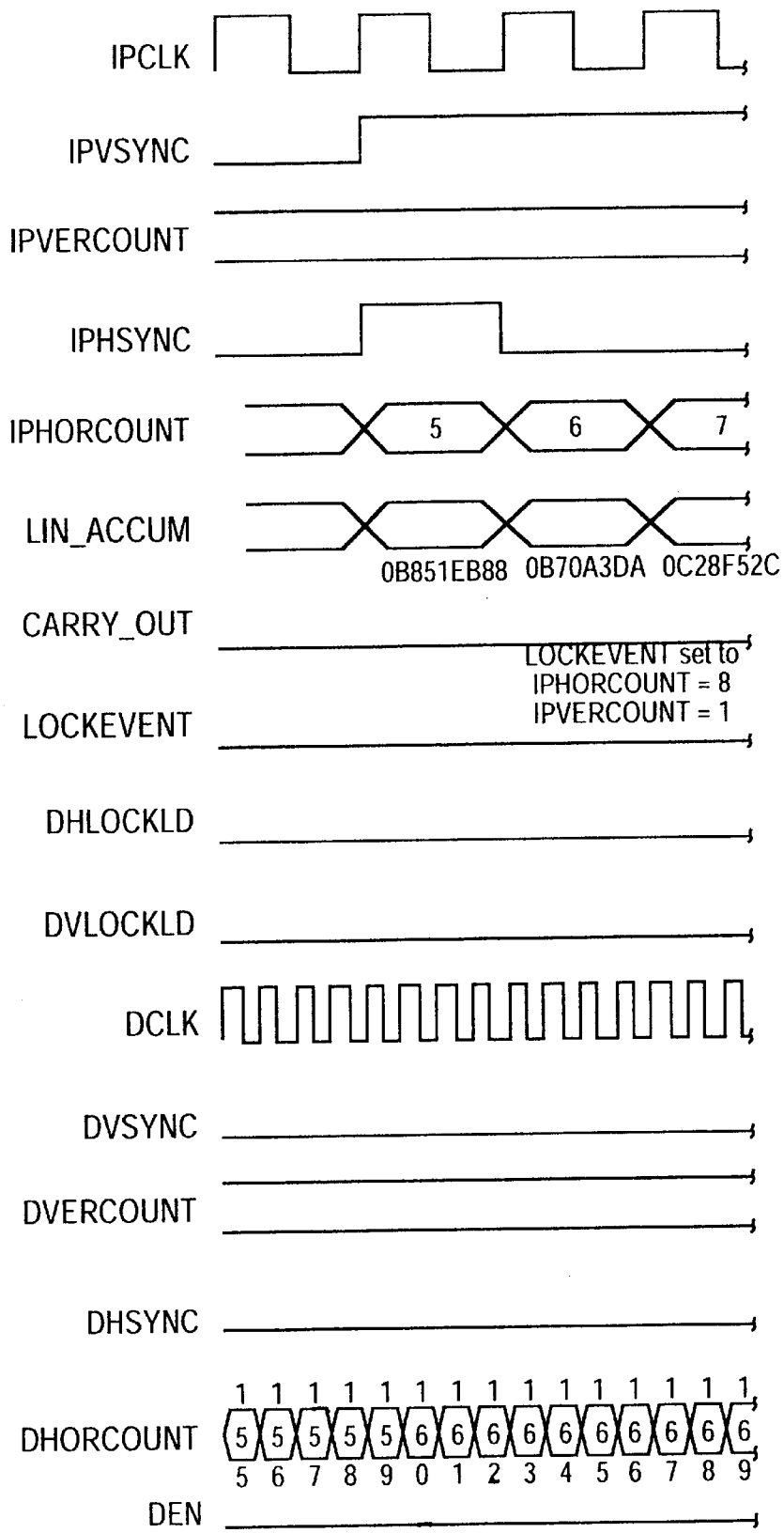
FIG. 14 is a timing chart which shows lock event timing for frame lock mode or line synchronized mode according to the present invention.

As shown in FIG. 13, when either of the LINE SYNC MODE or FRAME SYNC MODE is active, the DTGRUN output signal is generated in an identical manner as CLOCK SYNC MODE, as described in detail herein above. Also, the DHLOCKLD SELECT 840 passes any detected active pulses on the input signal LOCKEVENT through to the IHLOCKLD and IVLOCKLD signals which are then re-synchronized from the input clock domain (IPCLK) to the display clock domain (DCLK) by DHLOCKLD RESYNC 855 and DVLOCKLD RESYNC 865, respectively, to generate the output signals DHLOCKEVENT and DVLOCKEVENT, as shown in FIG. 14.

Also, when LINE SYNC MODE is active the display synchronizer 410 synthesizes the display line rate from the input video main clock so that the resulting output line rate follows any variations in the input video clock. Therefore, the display line rate follows any variations in the input line rate. LINE SYNC MODE operates with the assumption that the input video main clock is a line locked clock such that there is a constant integer number of input main clock (IPCLK) periods for each input video line period.

Figure 15:
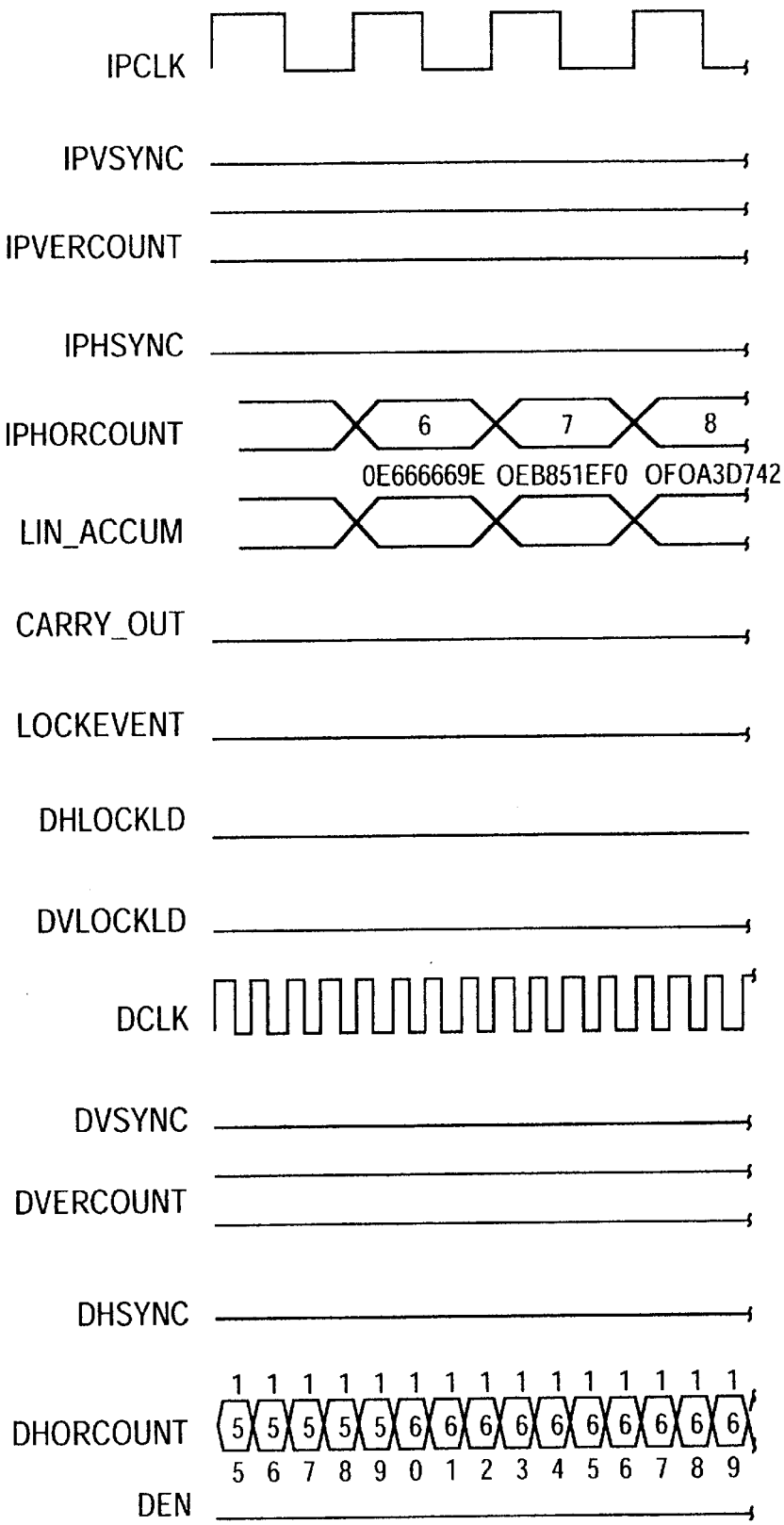
FIG. 15 is a timing chart which shows display end of line timing for line synchronized mode according to the present invention.

The display line rate is controlled according to a rate control word (INCREMENT) in the programmable control register. The control word provides a fractional binary value which is used as input to the added 810. The adder output drives accumulator register 825 which is reset to zero whenever a lock event occurs. The added 810 increments the accumulator register 825 contents by the value contained in the rate control word register (INCREMENT) with each input main clock (IPCLK) cycle. As shown in FIG. 15, when the added accumulator overflows to generate a carry out (CARRY_OUT) from the addition, the carry out register 820 produces a pulse on the LINESYNC_DHLOCKLD signal which is propagated by DHLOCKLD_SELECT 840 to drive the IHLOCKLD. The IHLOCKLD signal is then re-synchronized from the input clock domain (IPCLK) to the display clock domain (DCLK) by DHLOCKLD RESYNC 855 to generate the output signal DHLOCKEVENT. The resulting pulses of the DHLOCKEVENT output signal cause the DISPLAY TIMING GENERATOR to load to a predefined horizontal timing state within the horizontal blanking period of the display line.

Therefore, the LINE SYNC MODE provides a means for producing a display line rate that is controlled as a fractional multiple of the input video main clock resulting in a display line rate that follows any variations in the input video main clock and therefore follows any variation in the input video line rate. The LINE SYNC MODE also provides an apparatus and method for forcing the display video timing to synchronize to a lock event on a frame by frame basis. The LINE SYNC MODE is useful for format conversion systems where the display main clock is either free running or synthesized using frequency synthesis phase lock loop such that the resulting display frame period is similar to the input video frame period. In LINE SYNC MODE the display frame period need not be identical to the input frame period since the display synchronizer 410 forces the display frames to remain locked to input frames, provided that the display device can accommodate transients to the display timing as a result of the lock event.

The FRAME SYNC MODE provides a means for forcing the display video timing to synchronize to a lock event on a frame by frame basis. The FRAME SYNC MODE is useful for format conversion systems where the display main clock is either free running or synthesized using frequency synthesis phase lock loop such that the resulting display frame period is similar to the input video frame period. In FRAME SYNC MODE the display frame period need not be identical to the input frame period since the display synchronizer 410 forces the display frames to remain locked to input frames, provided that the display device can accommodate transients to the display timing as a result of the lock event.

DISPLAY TIMING GENERATOR DESCRIPTION

Figure 9:
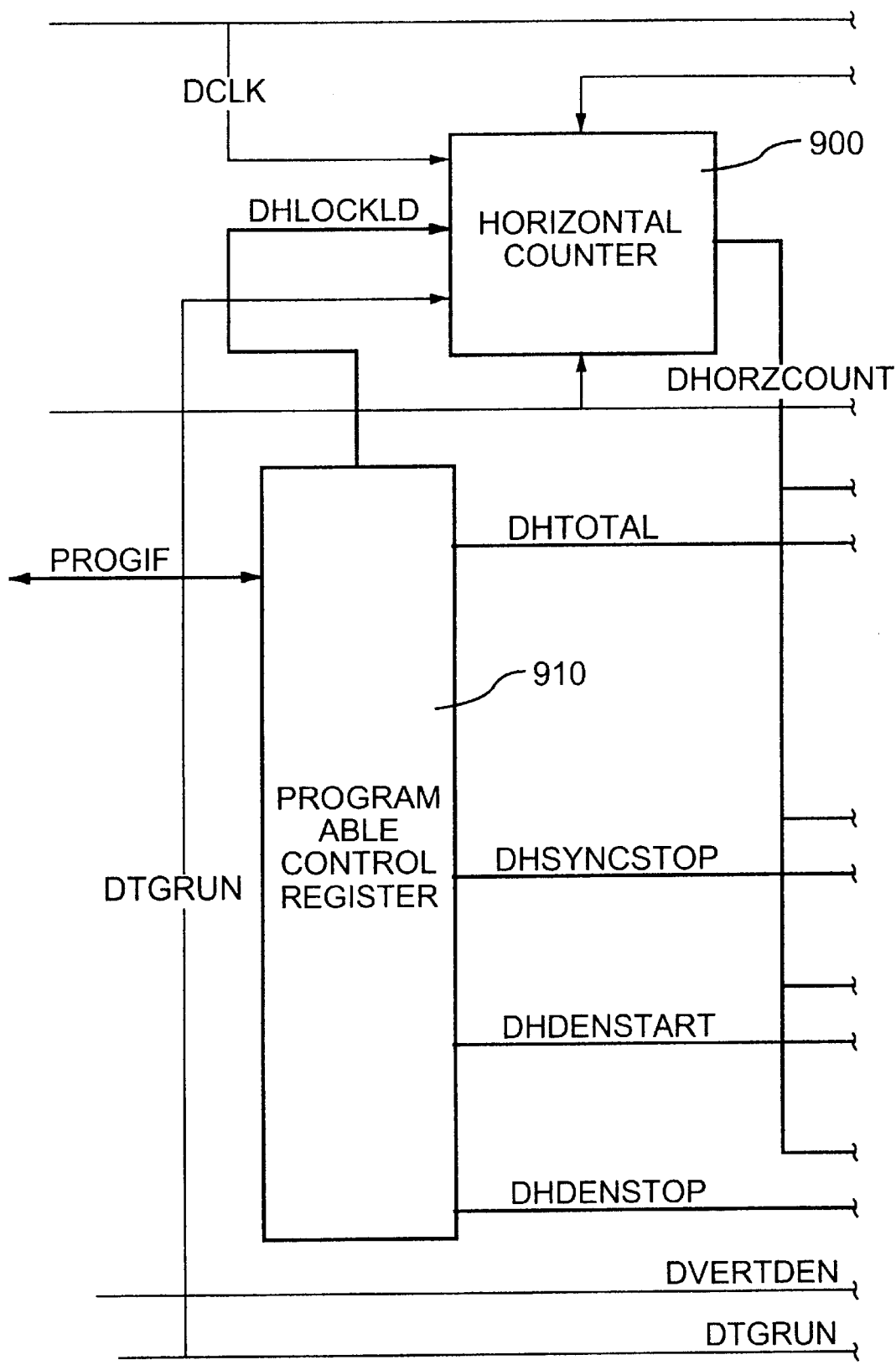
FIG. 9 is a block diagram of a display timing generator horizontal controller according to the preferred embodiment.
Figure 10:
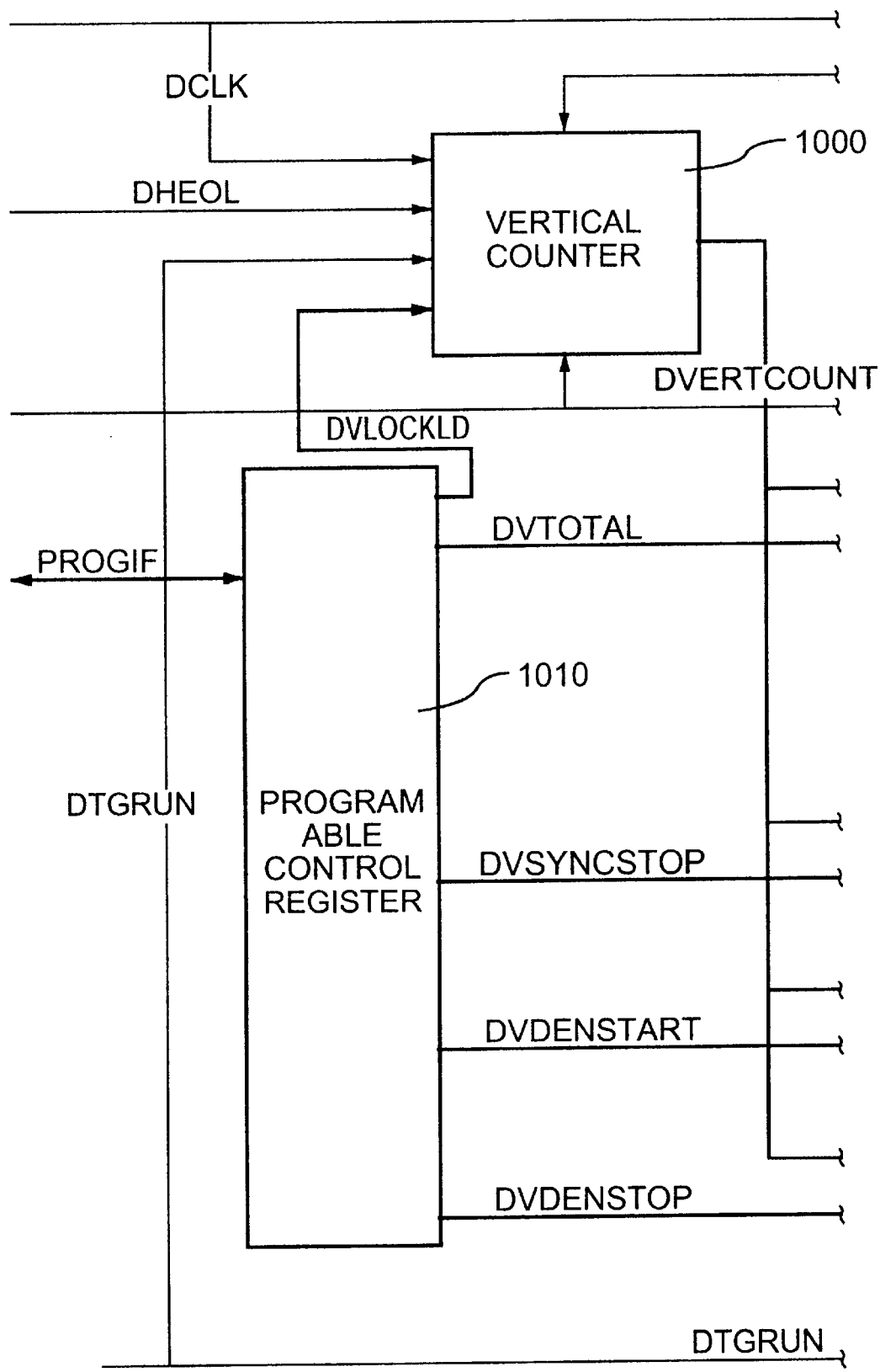
FIG. 10 is a block diagram of a display timing generator vertical controller according to the preferred embodiment.

The DISPLAY TIMING GENERATOR 330 shown in FIG. 3 comprises a Horizontal Controller as shown in FIG. 9 and a Vertical Controller as shown in FIG. 10.

The Horizontal Controller runs synchronous with the display clock, DCLK, and generates synchronization signals for controlling the display device and the format converter data output. The Horizontal Controller also provides a DHEOL signal to the Vertical Controller to indicate transitions from one display line to the next. The Vertical Controller counts display lines using DHEOL to determine the duration of the DVSYNC output signal and also generates a DVERTDEN signal which is used by the Horizontal Controller for generating a DEN signal.

DISPLAY HORIZONTAL CONTROLLER DESCRIPTION

A horizontal counter 900 counts DCLK periods. When the DTGRUN input signal is not active then the counter is disabled and held to an initial value. When the DTGRUN signal is active, then the counter is enabled to run. The counter is also controlled by the display horizontal end of line signal DHEOL generated by the DHTOTAL GEN Circuit 960. DHEOL is an active pulse which occurs at the end of each horizontal line to reset the horizontal counter to the start of a display line. The counter is also controlled by the DHLOCKEVENT signal which is input from the display synchronizer 410. DHLOCKEVENT causes the counter to load with the DHLOCKLD value which sets the counter to the display horizontal line position according to the programmable value, DHLOCKLD.

The horizontal counter 900 output is connected to a series of compare circuits 920, 930, 940, 950. Each compare circuit generates an active pulse on the compare output signal when the count value (DHORZCOUNT) is equal in magnitude to the reference value to which it is being compared. The reference values used for comparison are stored in programmable control register 910 which can be programmed by means of the micro controller interface (PROGIF). The reference compare values are used to define the events which should cause the Horizontal Controller to produce charges to the state of the output signals.

The sequence of operation for a horizontal display line as controlled by the Horizontal Controller is as follows:

An initialization the horizontal reference compare values are set to predetermined values or can also be loaded by the external micro controller 150 with predetermined values corresponding to the desired display output format. Also, at initialization the DTGRUN signal is in the not active state which forces the DHTOTAL GEN 960, DHSYNC GEN 970, and DEN GEN 980, circuits to hold the Horizontal Controller outputs: DHEOL, DHSYNC, and DEN, in the not active state.

When the DTGRUN input signal is driven active the horizontal counter 900 starts incrementing with each DCLK cycle. The DHSYNCGEN 970 circuit detects a DTGRUN input signal transition from not active to active and produces an active state on the DHSYNC output signal. Each DCLK pulse causes the horizontal counter 900 to increment by one. When the DHORZCOUNT is equal to the DHSYNCSTOP value then the comparator 930 generates an output pulse to the DHSYNC GEN circuit 970, which de-activates the DHSYNC output signal. The horizontal counter continues to increment. When the DHORZCOUNT is equal to the DHDENSTART value then the comparator 940 produces an output pulse. If the comparator 940 output pulse occurs while the DVERTDEN signal is active, then the DEN GEN circuit 980, activates the DEN signal. The horizontal counter 900 continues to increment and when DHORZCOUNT is equal to the DHDENSTOP value then the comparator 950, produces an output pulse which causes the DEN GEN circuit to de-activate the DEN output signal. The horizontal counter 900 continues to increment and when DHORZCOUNT is equal to the DHTOTAL value then the comparator 920, produces an output pulse which causes the DHTOTAL GEN circuit 960, to produce an active output pulse of the DHEOL signal. The active DHEOL pulse causes the horizontal counter 900, to reset to the start of line value. The active DHEOL pulse also causes the DHSYNC GEN circuit 970, to activate the DHSYNC output signal.

The Horizontal Controller will synchronize to any active pulses of the DHLOCKEVENT input signal. An active DHLOCKEVENT input signal causes the horizontal counter 900 to load with the programmable DHLOCKLD value. The DHLOCKEVENT (1) forces the DHTOTAL GEN 960 to de-activate the DHEOL output, (2) forces the DHSYNC GEN 970 to de-activate the DHSYNC output, and (3) forces the DEN GEN CCT 980 to de-activate the DEN signal.

DISPLAY VERTICAL CONTROLLER DESCRIPTION

A vertical counter 1000 counts lines by counting active pulses on the DHEOL signal generated by the Horizontal Controller. When the DTGRUN input signal is not active then the vertical counter 1000 is disabled and held to an initial value. When the DTG RUN signal is active, then the vertical counter is enabled to run. The vertical counter 1000 is also controlled by the display Vertical End Of Frame signal DVEOF generated by the DVTOTAL, GEN Circuit 1060. DVEOF is an active pulse which occurs at the end of each display frame to reset the vertical counter to the start of a display frame. The counter is also controlled by the DVLOCKEVENT signal which is input from the display synchronizer 410. DVLOCKEVENT causes the vertical counter to load with the DVLOCKLD value which sets the counter to the display vertical line position according to the programmable value, DVLOCKLD.

The vertical counter 1000 output is connected to a series of compare circuits 1020, 1030, 1040, 1050. Each compare circuit generates an active pulse on the compare output signal when the count value, DVERTCOUNT is equal in magnitude to the reference value to which it is being compared. The reference values used for comparison are stored in the programmable control register 1010, which can be programmed by means of the micro controller interface (PROGIF). The reference compare values are used to define the events which should cause the Vertical Controller to produce changes to the state of the output signals.

The sequence of operation for a display frame as controlled by the Vertical Controller is as follows:

At initialization the Vertical reference compare values are set to predetermined values or can also be loaded by the external micro controller 150 with predetermined values corresponding to the desired display output format. Also, at initialization the DTGRUN signal is in the not active state which forces the DVTOTAL GEN 1060, DVSYNC GEN 1070, and DVERTDEN GEN circuit 1080, to hold the Vertical Controller outputs: DVEOL, DVSYNC, and DVERTDEN, in the not active state.

When the DTGRUN input signal is driven active the vertical counter starts incrementing with each DHEOL pulse. The DHSYNC GEN circuit 1070 detects a DTGRUN input signal transition from not active to active and produces an active state on the DVSYNC output signal. Each DHEOL pulse causes the vertical counter 1000 to increment by one. When the DVERTCOUNT is equal to the DVSYNCSTOP value then the comparator 1030 generates an output pulse to the DVSYNC GEN circuit 1070 which de-activates the DVSYNC output signal. The vertical counter continues to increment. When the DVERTCOUNT is equal to the DVDENSTART value then the comparator 1040 produces an output pulse which causes the DVERTDEN GEN circuit to activate the DVERTDEN signal.

The vertical counter continues to increment and when DVERTCOUNT is equal to the DVDENSTOP value then the comparator 1050 produces an output pulse which causes the DVERTDEN GEN circuit 1080 to de-activate the DEN output signal. The vertical counter continues to increment and when DVERTCOUNT is equal to the DVTOTAL value then the comparator 1020 produces an output pulse which causes the DVTOTAL GEN 1060 circuit to produce an active output pulse on the DVEOF output signal. The active DVEOF pulse causes the vertical counter 1000 to reset to the start of frame initial value. The active DVEOF pulse also causes the DVSYNC GEN circuit to activate the DVSYNC output signal.

The Vertical Controller will synchronize to any active pulses on the DVLOCKEVENT input signal. An active DVLOCKEVENT input signal causes the Vertical Counter 1000 to load with the programmable DVLOCKLD value. Also, the DVLOCKEVENT (1) forces the DVTOTAL GEN 1060 to de-activate the DVEOF output, (2) forces the DVSYNC GEN 1070 to de-activate the DVSYNC output, and (3) forces the DVERTDEN GEN CCT 1080 to de-activate the DVERTDEN signal.

PHYSICAL IMPLEMENTATION DESCRIPTION

The method and apparatus described above can be implemented with discrete integrated circuits, memories, field programmable gate arrays, or other off the shelf electronic components. However, the preferred embodiment is a single integrated circuit which contains all of the functions described as part of the embodiment with the exception of the displayed clock synthesis PLLs 730 and 740, and the free running oscillator 710 shown in FIG. 7. The display clock synthesis PLLs are implemented using "off the shelf" devices such as ICS1522 and ICD2061, and the free running oscillator is implemented using an "off the shelf" oscillator device with a single clock output.

Alternative embodiments and modifications of the invention are possible without departing from the sphere and scope as set forth in the claims appended hereto.

What is claimed is:

1. A format converter for receiving successive input frames of a digital video input signal characterized by a first viewable display resolution, pixel rate and line rate, and in response generating successive output frames of a digital video output signal for viewing on a display characterized by a second viewable display resolution, pixel rate and line rate, said format converter comprising:

programming interface means for receiving operating mode information indicative of said first and second viewable resolutions, pixel rates and line rates;

memory means for storing said digital video input signal;

display processor means for retrieving said digital video input signal from said memory means, performing at least one of de-interlacing, filtering and scaling of said digital video input signal, and in response generating said digital video output signal; and display timing controller means including a free-running display clock, aid display timing controller means deriving synchronization and control information from said digital video input signal based on said operating mode information received by said programming interface means, and in response controlling operation of said display processor means to generate said successive output frames of said digital video output signal synchronous with said free-running display clock and frame locked to respective ones of said successive nput frames for display at said second viewable display resolution, pixel rate and line rate which is a fractional multiple of said first viewable pixel rate.

2. The format converter of claim 1, wherein said display timing controller further comprises:

clock generation means which incorporates said free-running display clock, said clock generation means generating a display main clock signal;

a lock event controller for generating a lock event signal at a predetermined instant of each frame of said digital video input signal;

display synchronizer means for generating a display horizontal lock event signal and a display vertical lock event signal for controlling synchronization between said digital video input signal and said digital video output signal based on said lock event signal and said operating mode information; and display timing generator means for generating timing signals synchronized to said horizontal and vertical lock event signals to control said display processor means in accordance with said operating mode information.

3. The format converter of claim 2, wherein said clock generation means further comprises:

phase lock loop means for receiving an input clock signal derived from said digital input video signal and in response generating a synthesized clock signal which is a ratio multiple of said input clock signal; and a clock selector for selecting one of said free running display clock or said phase lock loop as a source for output of said display main clock signal.

4. The format converter of claim 3, wherein said lock event controller further comprises:
- a programmable control register for generating a predetermined horizontal lock event value and a predetermined vertical lock event value based on said operating mode information;
- a horizontal pixel event counter for counting successive cycles of said input clock signal relative to each of a succession of horizontal synchronization pulses of said digital input video signal and in response generating a horizontal pixel count value;
- a horizontal pixel event comparator for comparing said horizontal pixel count value with said predetermined horizontal lock event value, and when said horizontal pixel count value is equal to said predetermined horizontal lock event value then generating a horizontal lock event pulse;
- a vertical line counter for counting successive ones of said horizontal synchronization pulses relative to a succession of input vertical synchronization pulses of said digital input video signal and in response generating a vertical line count value;
- a vertical line event comparator for comparing said vertical line count value with said predetermined vertical lock event value, and when said vertical line count value is equal to said predetermined vertical lock event value then generating a vertical lock event pulse;
- a lock event generator for generating a lock event pulse when said horizontal lock event pulse and said vertical lock event pulse coincide; and
- a lock event selector for selecting one of either a frame synchronization signal derived from said digital input video signal, said input clock signal, or said lock event pulse for output as said lock event signal based on said operating mode information.

5. The format converter of claim 4, wherein said display synchronizer further comprises circuitry for receiving said input clock signal, said display main clock signal, said lock event signal and said operating mode information, and in response generating said display horizontal and vertical lock event signals and a run enable signal wherein:
- (i) in the event said operating mode information indicates a free run operating mode, the display horizontal and vertical lock event signals are suppressed so that there is no synchronization between said digital input video signal and said digital output video signal, and said run enable signal is synchronized to said display main clock signal for enabling and disabling said display timing generator;
- (ii) in the event said operating mode indicates a clock synchronized mode of operation, the display horizontal and vertical lock event signals are synchronized to said lock event signal initially at start up, and said run enable signal is synchronized to said display main clock signal thereafter for enabling and disabling said display timing generator;
- (iii) in the event said operating mode indicates a frame synchronized mode of operation, the display horizontal and vertical lock event signals are synchronized to said lock event signal on a per frame basis of the digital input video signal, and said run enable signal is synchronized to said display main clock signal for enabling and disabling said display timing generator; and
- (iv) in the event said operating mode indicates a line synchronized mode of operation, the display horizontal and vertical lock event signals are synchronized to said lock event signal on a per line and per frame basis of the digital input video signal, and said run enable signal is synchronized to said display main clock signal for enabling and disabling said display timing generator.

6. The format converter of claim 5 wherein said display timing generator further comprises:
- a horizontal controller for receiving said display main clock signal, said operating mode information, said horizontal lock event signal and said run enable signal and in response generating a horizontal end of frame for indicating transitions between successive lines of said digital output video signal, a display horizontal synchronization signal for driving said display, an output enable signal for enabling said display; and
- a vertical controller for receiving said display main clock signal, said operating mode information, said vertical lock event signal, said run enable signal and said horizontal end of frame signal and in response generating a display vertical synchronization signal for driving said display, and a display vertical enable signal for application to said horizontal controller in connection with generating said output enable signal.

7. The format converter of claim 1 wherein said digital input video signal is an interlaced signal and said digital output video signal is a progressive scan signal.

8. The format converter of claim 1 wherein said digital input video signal is a progressive scan signal and said digital output video signal is also a progressive scan signal.

9. A display timing controller for deriving synchronization and control information from successive input frames of a digital video input signal which is characterized by a first viewable display resolution, pixel rate and line rate and in response controlling operation of said display processor to generate successive output frames of a digital video output signal for display at a second viewable display resolution, pixel rate and line rate different from said first viewable display resolution, pixel rate and line rate, comprising:
- clock generation means including a free-running display clock for generating a display main clock signal;
- a lock event controller for generating a lock event signal at a predetermined instant of each frame of said digital video input signal;
- display synchronizer means for generating a display horizontal lock event signal and a display vertical lock event signal for controlling synchronization between said digital video input signal and said digital video output signal based on said lock event signal; display timing generator means for generating timing signals synchronized to said horizontal and vertical lock event signals to control said display processor to generate said successive output frames of said digital video output signal synchronous with said free-running display clock and frame locked to respective ones of said successive input frames for display at said viewable display resolution, pixel rate and line rate which is a fractional multiple of said first viewable pixel rate.

* * * * *